United States Patent [19]
Matison

[11] Patent Number: 6,018,570
[45] Date of Patent: Jan. 25, 2000

[54] METHODS AND APPARATUS FOR REGULATING THE REMOTE ORDERING, AUTHORIZATION, ACCESS AND CONTROL OF SERVICES AND SERVICE FEATURES ASSOCIATED WITH A TERMINAL

[75] Inventor: Gary G. Matison, Norwalk, Conn.

[73] Assignee: Nynex Science and Technology Inc., White Plains, N.Y.

[21] Appl. No.: 08/854,618

[22] Filed: May 12, 1997

[51] Int. Cl.[7] .......................... H04M 3/42; H04M 17/00; H04M 11/00
[52] U.S. Cl. .......................... 379/201; 379/196; 379/154; 379/93.12; 379/93.03
[58] Field of Search ................................... 379/188, 189, 379/191, 194, 195, 196, 197, 198, 201, 210, 211, 212, 143, 145, 154, 93.03, 93.12

[56] References Cited

U.S. PATENT DOCUMENTS

| | | | |
|---|---|---|---|
| 4,313,035 | 1/1982 | Jordan et al. ............................ | 379/211 |
| 4,531,023 | 7/1985 | Levine ................................. | 379/93.02 |
| 4,764,919 | 8/1988 | Hunter et al. .......................... | 370/259 |
| 4,766,604 | 8/1988 | Axberg ................................. | 379/197 |
| 5,003,595 | 3/1991 | Collins et al. .......................... | 379/198 |
| 5,365,580 | 11/1994 | Morisaki .............................. | 379/189 |
| 5,852,653 | 12/1998 | Reel et al. ............................ | 379/188 |
| 5,878,127 | 3/1999 | Fleischer, III .......................... | 379/196 |
| 5,943,414 | 8/1999 | McIntee et al. ....................... | 379/220 |

*Primary Examiner*—Scott Wolinsky
*Assistant Examiner*—Benny Q. Tieu
*Attorney, Agent, or Firm*—Straub & Pokotylo; John C. Pokotylo

[57] ABSTRACT

A method for use in an environment having a service provider, a subscribed terminal, and a remote terminal, for activating a service for the subscribed terminal. The method processes an order from a terminal and processes an authorization request from a terminal. However, the service order is activated only upon an authorization request from the subscribed terminal. The subscribed terminal may be a telephone in which case a caller ID value provided by a central office switch serving the requesting terminal is used to determine whether a requesting telephone is the subscribed telephone.

37 Claims, 18 Drawing Sheets

FIGURE 9a

| Prompt No. | Prompt Name | Prompt |
|---|---|---|
| 1 | welcome | Welcome to CallAbility Feature Access. |
| 2 | enterdn | Please enter the area code and telephone number you subscribe to. |
| 3 | entcancl | Entry canceled. |
| 4 | inuse | We are sorry, the number you entered is currently in use. |
| 5 | nsubsry | We are sorry but you are not listed as a subscriber. Please contact your local telephone office for further information. |
| 6 | wrngcode | The number is incorrect. |
| 7 | enterpin | Please enter your password. |
| 8 | badcode | The password is incorrect. |
| 9 | npinsry | We are sorry, the number you entered does not match our records. Please contact your business office for further information. |
| 10 | daring | Your don't answer ring count is ... |
| 11 | cfvmm | For call forwarding features, press 1. |
| 12 | cfblmm | For busy line features, press 2. |
| 13 | vfymm | To learn the status of your features, press 4. |
| 14 | cfdamm | For don't answer features or to change the number of rings before forwarding, press 3. |
| 15 | pinmm | To change your password, press 8. |
| 16 | notopt | That is not an option. |
| 17 | cfvmenu | To activate call forwarding, press 1. To deactivate call forwarding, press 2. |
| 18 | entrfwdn | Please enter the telephone number you wish to forward your calls to, including the area code if it is necessary. |
| 19 | ifcorr | If this is correct, press 1; if incorrect, press 2. |
| 20 | actwait | The call forwarding feature is being activated. |
| 21 | cfbmenu | To activate the busy line feature, press 1. To deactivate the busy line feature, press 2. |
| 22 | proc | Your request is being processed. |
| 23 | dactwait | The call forwarding feature is being deactivated. |

FIGURE 9b

| 24 | cfdmenu | To activate the don't answer feature, press 1. To deactivate the don't answer feature, press 2. To change the number of ring counts, press 3. |
|---|---|---|
| 25 | blon | Your busy line feature is currently ON. |
| 26 | bloff | Your busy line feature is currently OFF. |
| 27 | daoff | Your don't answer feature is currently OFF. |
| 28 | fwoff | Your don't answer feature is currently OFF. |
| 29 | daon | Your don't answer feature is currently ON. |
| 30 | entrring | Please enter the number of times you would like your phone to ring before your call is forwarded. |
| 31 | youentr | You entered ... |
| 32 | ringcnfm | The ring count has been changed. |
| 33 | fwon | Your call forwarding is currently ON. Your calls are forwarded to ... |
| 34 | bye | Thank you for using NYNEX CallAbility Service. Good bye. |
| 35 | sorry | We are sorry, please try again later. |
| 36 | actdone | The feature has been activated. |
| 37 | deactdone | The feature has been deactivated. |
| 38 | delay | Your request will be processed as soon as possible. We are sorry for the delay. |
| 39 | hangup | You may hang up now, or ... |
| 40 | addpin | To add a secondary password, press 1. |
| 41 | delpin | |
| 42 | chgpin | To delete a secondary password, press 2. |
| 43 | modcode | To change your primary or secondary password, press 3. |
| 44 | cnfmnew | Please re-enter your new password for confirmation. |
| 45 | badcnfm | You have not entered the same 4-digit password twice. |

FIGURE 9c

| 46 | adddone | Your password has been added. |
|---|---|---|
| 47 | delcode | Please enter the secondary password you wish to delete |
| 48 | nomtch | The password you entered does not match our records. |
| 49 | cnfmdel | To erase this password, press 1. Otherwise, press 2. |
| 50 | moddone | Your password has been changed. |
| 51 | deldone | Your password has been erased. |
| 52 | oldcode | Please enter the password that you wish to change. |
| 53 | retmm | ... to continue to the main menu, press star. |
| 54 | hangon | To wait to hear confirmation for your request, please stay on the line. |
| 55 | unable | We are unable to process your request. Please try again. |
| 56 | mainm | Main Menu. |
| 57 | prevact | The feature is already ON. |
| 58 | prevdact | The feature is already OFF. |
| 59 | xcdopt | You have exceeded the number of attempts allowed for this option. |
| 60 | englsess | To continue in English, press 1. |
| 61 | spansess | To continue in Spanish, press #. |
| 62 | ils_err | You must hang up your CallAbility subscribed phone in order for this request to be processed. |
| 63 | preach | You have reached the CallAbility Order Confirmation System. |
| 64 | penter | Please enter your CallAbility subscribed 10-digit phone number. |
| 65 | pword | Please enter your subscriber password. |
| 66 | pbye | Thank you. Your confirmation is complete. Good Bye. |
| 67 | pphone | Sorry, you must use your CallAbility subscribed phone to confirm your order. Please try again. Good Bye. |
| 68 | pwrong | Sorry, you must use the password issued to you at order entry time. Good bye. |

METHODS AND APPARATUS FOR REGULATING THE REMOTE ORDERING, AUTHORIZATION, ACCESS AND CONTROL OF SERVICES AND SERVICE FEATURES ASSOCIATED WITH A TERMINAL

BACKGROUND OF THE INVENTION a. Field of the Invention

The present invention concerns the regulation of remote ordering, authorization, access and control of services and service features of a terminal. More specifically, the present invention concerns the prevention of fraudulent ordering and activation of services for a terminal and the prevention of fraudulent access and control of service features of a terminal, for example, of features of a user's telephone service (e.g., call forwarding parameters) from a remote terminal (e.g., a telephone other than the user's telephone).

b. Related Art

Regional bell operating companies (or "RBOCs") and other telephone service providers (hereafter collectively referred to as "TELCOs") are continuously adding new services (e.g., caller ID, call waiting, caller identity delivery on call waiting, call forwarding, call forward variable, call forward busy line, call forward don't answer, etc.) in an effort to better serve their customers and to better utilize existing infrastructure.

At least one TELCO will now permit subscribed users to access and control certain features of certain of their services "remotely", i.e., from a terminal (e.g., a telephone or station set) other than the terminal (e.g., a telephone or station set) with which the services are associated. (This type of service will hereafter be referred to as "CallAbility Feature Access Service" or simply "CallAbility". "CallAbility" is a service mark of NYNEX.) A personal identification number (or "PIN") may be used to help verify that the caller is authorized to remotely access and control such service features.

For example, a CallAbility service subscriber can remotely (e.g., from any touch tone telephone or terminal) access and control certain call forwarding services of their subscribed telephone. Call forwarding services include, inter alia: (i) Call Forward Variable (or "CFV") service which allows a subscriber to redirect calls incoming to his or her telephone to a different line; (ii) Call Forwarding Busy Line (or "CFBL") service which allows a subscriber to automatically redirect incoming calls to a fixed directory number, such as to a voice mail or to another service provider (e.g., a message desk), when his or her telephone line is busy (e.g., if their telephone is off-hook); and (iii) Call Forwarding Don't Answer (or "CFDA") service which allows a subscriber to redirect incoming calls to a fixed directory number, such as to a voice mailbox or message desk, after a specified number of rings (e.g., 2 through 7) when their line is idle (e.g., on-hook). A CallAbility service subscriber can, from any touch tone telephone (i.e., a telephone capable of generating dual tone multi-frequency (or "DTMF") signals): (i) activate or deactivate their Call Forward Busy Line service; (ii) activate or deactivate their Call Forward Don't Answer service; (iii) reset the number of rings needed before the call is forwarded pursuant to their Call Forward Don't Answer service; (iv) activate or deactivate their Call Forward Variable service; and/or (v) change the forwarding number of their Call Forward Variable service. It is possible to permit a user to effect the above listed changes from a rotary telephone.

Many TELCO customers enjoy the ability to remotely (i.e., from any terminal or telephone) activate or deactivate their Call Forward Variable service and/or change the forwarding number of their Call Forward Variable service. Imagine, for example, that a TELCO customer will leave their office on a business trip during which they will stay at two (2) hotels in two (2) cities. Such a customer may, from their own telephone, before they leave, activate their Call Forward Variable service and input the telephone number of the hotel at the first city of their business trip. Thereafter, they can remotely alter the forwarding number of their Call Forward Variable service to forward calls to the telephone number of the hotel at the second city of their business trip. Unfortunately, however, fraud has made this enhanced CallAbility service less profitable for the TELCO at this time. If the growth of such fraud is not arrested, offering this enhanced CallAbility service may become impractical.

More specifically, when CallAbility service has been offered to permit the remote access and control of Call Forward Variable service features, a fraudulent scheme has been used to pre-subscribe an unsuspecting victim's telephone to CallAbility. A perpetrator calls, from any telephone, the business office of a TELCO and orders a feature, typically Call Forward Variable, on the victim's line. The perpetrator will then also order CallAbility service on the line. At this point, since the CallAbility service permits the remote access and control of Call Forward Variable service features, the perpetrator could then control the forwarding number of the Call Forwarding Variable service, and set the call forwarding number to a long distance destination. Thereafter, a local call to the victim's telephone would terminate at the long distance number and the victim would incur toll charges. Moreover, the perpetrator could activate and deactivate and change the forwarding number of the Call Forward Variable service to minimize the chances of detection by the victim. In such instances, the victim is unlikely to detect the fraudulent use until after they receive their telephone bill. Although operators at the business office of TELCO often ask for some form of identification (e.g., a drivers license number, a social security number, a number on the customers telephone bill, etc.), such identification is not always secure, not always asked for, and may be difficult to quickly verify.

Other fraudulent schemes may also be possible. Thus, if such fraud grows, TELCOs may consider limiting the capabilities of CallAbility to minimize fraud. However, subscribers still constantly desire more capabilities from their communications services provider. More generally, remote access and control of service features assigned to a terminal may need to be limited if fraud increases, even in instances where customers desire less limitations on their remote access and control.

SUMMARY OF THE INVENTION

In view of the forgoing, a need exists for methods and apparatus for permitting enhanced remote access and control of service features assigned to a terminal, while simultaneously minimizing the possibility of fraud. In an environment having a service provider, a subscribed terminal, and a remote terminal, the present invention provides a method for activating a service for the subscribed terminal. The method (a) processes an order, from the subscribed terminal or the remote terminal, for the service for the subscribed terminal, and (b) processes an authorization request from the subscribed terminal or the remote terminal, for the service ordered such that the service order is activated only upon an authorization request from the subscribed terminal.

The step of processing an order may include sub-steps of (i) accepting order information, (ii) retrieving stored pre-authorized order data, if it exists, (iii) determining whether the order has been pre-authorized based on the stored pre-authorized order data retrieved and (iv) if the order has not been pre-authorized, storing the order information as an inactive order. Otherwise, if the order has been pre-authorized, the requested order is processed so that the service is activated. The requested order may be activated by storing the requested order as an activated order.

The step of processing an authorization request for the service ordered may include sub-steps of (i) accepting an incoming authorization request, (ii) determining an identity of the terminal from which the authorization request was accepted, and (iii) determining whether the terminal identity determined is the subscribed terminal. If the terminal identity determined is not the subscribed terminal, the order is not authorized. If, on the other hand, the terminal identity determined is the subscribed terminal, terminal identifications associated with inactivated orders, if any, are retrieved, and whether the terminal identity of the subscribed terminal matches one of the terminal identifications associated with inactive orders is determined. If the terminal identity of the subscribed terminal matches one of the terminal identifications associated with inactive orders, the inactive order associated with the matching terminal identification is activated. If, on the other hand, the terminal identity of the subscribed terminal does not match any of the terminal identifications associated with inactive orders, the authorization request is saved as a pre-authorization for a service order to be placed for the subscribed terminal.

The subscribed terminal may be a telephone, in which case the sub-step of determining an identity of the terminal from which the authorization request was accepted is based on a caller ID value provided by a central office switch serving the requesting terminal. Further, in this case, the retrieved terminal identifications associated with inactive orders are telephone directory numbers.

The method of the present invention may also serve to process a request to pre-authorize an order for the service, from the subscribed terminal or the remote terminal. In this case, the service to be ordered will only be pre-authorized upon a pre-authorization request from the subscribed terminal. The step of pre-authorizing may include sub-steps of (i) accepting an incoming authorization request, (ii) determining an identity of the terminal from which the authorization request was accepted, and (iii) determining whether the terminal identity determined is the subscribed terminal. If the terminal identity determined is not the subscribed terminal, the order is not authorized or pre-authorized. If, on the other hand, the terminal identity determined is the subscribed terminal, terminal identifications associated with inactivated orders, if any, are retrieved and whether the terminal identity of the subscribed terminal matches one of the terminal identifications associated with inactive orders is determined. If the terminal identity of the subscribed terminal matches one of the terminal identifications associated with inactive orders, the inactive order associated with the matching terminal identification is activated. If, on the other hand, the terminal identity of the subscribed terminal does not match any of the terminal identifications associated with inactive orders, the authorization request is saved as a pre-authorization for a service order to be placed for the subscribed terminal.

In a telephony environment having a telephone service provider, a subscribed terminal, and a remote terminal, the present invention provides a method for activating a telephone service for the subscribed terminal. This method (a) processes an order, from the subscribed terminal or the remote terminal, for the service for the subscribed terminal, and (b) processes an authorization request, from the subscribed terminal or the remote terminal, for the telephone service ordered such that the telephone service ordered is activated only upon an authorization request from the subscribed terminal.

The step of processing an order may include sub-steps of (i) accepting order information, (ii) retrieving stored pre-authorized order data, if it exists, and (iii) determining whether the order has been pre-authorized based on the stored pre-authorized order data retrieved. If the order has not been pre-authorized, the order information is stored as an inactive order. If, on the other hand, the order has been pre-authorized, the requested order is processed so that the service is activated. The requested order may be activated by storing the requested order as an activated order.

The step of processing an authorization request for the telephone service ordered may include sub-steps of (i) accepting an incoming authorization request, (ii) determining a directory number of the terminal from which the authorization request was accepted, and (iii) determining whether the directory number determined matches a directory number of the subscribed terminal. If the directory number determined does not match the directory number of the subscribed terminal, the order is not authorized. If, on the other hand, the directory number determined matches the directory number of the subscribed terminal, directory numbers associated with inactivated orders, if any, are retrieved, and whether the directory number of the subscribed terminal matches one of the directory numbers associated with inactive orders is determined. If the directory number of the subscribed terminal matches one of the directory numbers associated with inactive orders, the inactive order associated with the matching directory number is activated. If, on the other hand, the directory number of the subscribed terminal does not match any of the directory numbers associated with inactive orders, the authorization request is saved as pre-authorization for a service order to be placed for the subscribed terminal.

The sub-step of determining the directory number of the terminal from which the authorization request was accepted may be based on a caller ID value provided by a central office switch serving the requesting terminal.

The method of the present invention may also process a request to pre-authorize an order for the telephone service, from the subscribed terminal or the remote terminal such that the telephone service ordered will only be pre-authorized upon a pre-authorization request from the subscribed terminal. The step of pre-authorizing may include sub-steps of (i) accepting an incoming authorization request, (ii) determining a directory number of the terminal from which the authorization request was accepted, and (iii) determining whether the directory number determined matches a directory number of the subscribed terminal. If the directory number determined does not match the directory number of the subscribed terminal, the order is not authorized or pre-authorized. If, on the other hand, the directory number determined matches the directory number of the subscribed terminal, directory numbers associated with inactivated orders, if any, are retrieved, and whether the directory number of the subscribed terminal matches one of the directory numbers associated with inactive orders is determined. If the directory number of the subscribed terminal matches one of the directory numbers associated with inactive orders, the inactive order associated with the matching directory number is activated. If, on the other hand, the directory number of the subscribed terminal does not match any of the directory numbers associated with inactive orders, the pre-authorization request is saved as a pre-authorization for a telephone service order to be placed for the subscribed terminal.

The present invention may also provide a method, for use in an environment having a service provider, a subscribed terminal, and a remote terminal, for processing an authorization request to activate an ordered service for the subscribed terminal, or for processing a request to pre-authorize an order to be placed for a service for the subscribed terminal.

The present invention also provides an apparatus for permitting enhanced remote access and control of service features assigned to a terminal, while simultaneously minimizing the possibility of fraud. More specifically, in an environment including a public inter-network, a private inter-network, at least one local network which can communicate with both the public inter-network and the private inter-network, a terminal, belonging to one of the local network(s), a subscribed terminal belonging to one of the local network(s), and an order processing means, the present invention provides an apparatus for activating a service for the subscribed terminal in response to an authorization request from a requesting terminal. The apparatus includes a transmitting terminal ID capture unit, an interactive session user interface unit, an application processor input/output interface unit, a user record database, an application processor, and a data communications system such as a LAN.

The transmitting terminal ID capture unit is adapted to receive an identification of the requesting terminal, via a first communications path, from one of the local network(s). The interactive session user interface unit is adapted to request information from the requesting terminal and to receive information from the requesting terminal. The application processor input/output interface unit is adapted to receive orders, via a second communication path, from the order processing means. The user record database contains records which include information including (i) terminal identity information, (ii) information identifying the service, (iii) information expressing whether or not an order for the service was placed, and (iv) information expressing whether or not an order for the service has been authorized. Alternatively, the service identity information, the order information, and/or the authorization information may be inferred from the location of a simple terminal identity record in the database. The data communication system permits data communication between the transmitting terminal ID capture unit, the interactive session user interface unit, the application processor input/output interface unit, the user record database, and the application processor.

The application processor is coupled with the application processor input/output interface unit. It is adapted to obtain the identification of the requesting terminal from the transmitting terminal ID capture unit, obtain the orders received by the application processor input/output interface unit, obtain user records from the user record database, update the user records of the user record database so that the information expressing whether or not an order for the service was placed indicates that an order was placed when an order is obtained, and update the user records of the user record database so that the information expressing whether or not an order for the service has been authorized indicates that an order is authorized only when the requesting terminal is the subscribed terminal. Alternatively, rather than updating the user records, the application processor may store new records having terminal identity information in a particular section of the user record database such that service identity information, order information, and/or authorization information may be inferred from the storage location.

The transmitting terminal ID capture unit may be a caller identification capture unit. The interactive session user interface unit may be an interactive voice response unit. The interactive voice response unit may be controlled by the application processor. For example, the application processor may download control scripts to the interactive voice response unit. The application processor may also download voice prompts to the interactive voice response unit.

The interactive session user interface unit may request an identification of the subscribed terminal with which the service is to be associated, from the requesting terminal. In response the requesting terminal may provide such an identification of the subscribed terminal. The interactive session user interface then forwards the received identification of the subscribed terminal to the application processor.

The terminal identity information of the records in the user record database may include a telephone directory number.

The application processor may determine whether the identification of the subscribed terminal sent from the interactive session user interface unit matches the identification of the requesting terminal sent by the terminal ID capture unit. If the application processor determines that the identification of the subscribed terminal sent from the interactive session user interface unit does not match the identification of the requesting terminal sent by the terminal ID capture unit, then the application processor may instruct the requesting terminal, via the interactive session user interface unit, to submit an authorization request from the subscribed terminal.

In a telephony environment including a public switched telephone network, a private inter-network, at least one local network having a central office switch, which can communicate with both the public switched telephone network and the private inter-network, a terminal, belonging to one of the local network(s), a subscribed terminal belonging to one of the local network(s), and an order processing means, the present invention provides an apparatus for activating a telephone service for the subscribed terminal in response to an authorization request from a requesting terminal. The apparatus includes a caller ID capture unit, an interactive session user interface unit, an application processor input/output interface unit, a user record database, an application processor and a data communication system such as a LAN.

The caller ID capture unit is adapted to receive a directory number of the requesting terminal, via a first communications path, from one of the local network(s). The interactive session user interface unit is adapted to request information from the requesting terminal and to receive information from the requesting terminal. The application processor input/output interface unit is adapted to receive orders, via a second communication path, from the order processing mean. The user record database contains records which include information including (i) terminal directory number information, (ii) information identifying the service, (iii) information expressing whether or not an order for the telephone service was placed, and (iv) information expressing whether or not an order for the service has been authorized. Alternatively, the service identity information, the order information, and/or the authorization information may be inferred from the location of a simple terminal directory record in the database. The data communication system permits the communication of data between the caller ID capture unit, the interactive session user interface unit, the application processor input/output interface unit, the application processor and the user record database.

The application processor is coupled with the application processor input/output interface unit, and adapted to obtain the directory number of the requesting terminal from the caller ID capture unit, obtain the orders received by the application processor input/output interface unit, obtain user records from the user record database, update the user records of the user record database so that the information expressing whether or not an order for the telephone service was placed indicates that an order was placed when an order is obtained, and update the user records of the user record database so that the information expressing whether or not an order for the service has been authorized indicates that an order is authorized only when the requesting terminal is from the subscribed terminal. Alternatively, rather than updating the user records, the application processor may store new records having a terminal directory number in a particular section of the user record data base such that service identity information, order information, and/or authorization information may be inferred from the storage location.

The interactive session user interface unit may be an interactive voice response unit. The interactive voice response unit may be controlled by the application processor. The application processor may download control scripts to the interactive voice response unit. The application processor may also download voice prompts to the interactive voice response unit.

The interactive session user interface unit may request a directory number of the subscribed terminal with which the service is to be associated from the requesting terminal. In response, the requesting terminal provides such a directory number of the subscribed terminal. Then, the interactive session user interface unit forwards the received directory number of the subscribed terminal to the application processor. The requesting terminal may provide the directory number of the subscribed terminal as dual tone multiple frequency signals.

The application processor determines whether the directory number of the subscribed terminal sent from the interactive session user interface unit matches the directory number of the requesting terminal sent by the caller ID capture unit. If the application processor determines that the directory number of the subscribed terminal sent from the interactive session user interface unit does not match the directory number of the requesting terminal sent by the caller ID capture unit, then the application processor instructs the requesting terminal, via the interactive session user interface unit, to submit an authorization request from the subscribed terminal.

BRIEF DESCRIPTION OF THE DRAWINGS

FIG. 4b is a flow diagram of an authorized activation (or pre-authorization) process used in a method of the present invention operating in the environment of FIG. 1a.

FIG. 9, which includes FIGS. 9a, 9b and 9c, is a table of voice prompts and messages which may be used in the environment of FIG. 1b.

DETAILED DESCRIPTION

The present invention concerns a novel method and apparatus for minimizing fraud in a service for permitting remote ordering, access, and control of services and service features associated with a terminal. The following description is presented to enable one skilled in the art to make and use the invention, and is provided in the context of a particular application and its requirements. Various modifications to the preferred embodiment will be apparent to those skilled in the art, and the general principles set forth below may be applied to other embodiments and applications. Thus, the present invention is not intended to be limited to the embodiments shown.

The following definitions are provided to help the reader understand the preferred embodiments of the present invention and are not intended to limit the claimed invention.

| | |
|---|---|
| Access Number | A 7 or 10-digit telephone number a user dials to access an Intelligent Peripheral. |
| ADN | Access Directory Number |
| ANI | Automatic Number Identification |
| CFV | Call Forwarding Variable |
| CFBL | Call Forwarding Busy Line |
| CFDA | Call Forwarding Don't Answer |
| CIN | Corporate Information Network |
| Directory Number | A telephone number associated with a user's telephone line. |
| DN | Directory Number |
| DTMF | Dual Tone Multi-Frequency |
| IMS | Integrated Management System |
| Intelligent Peripheral | Network element for facilitating a service for providing remote ordering access and control of services and service (e.g., call forwarding) features. |
| IP | Intelligent Peripheral |
| ISDN | Integrated Service Digital Network |
| IVRU | Interactive Voice Response Unit |
| Local Switch | Switch serving a subscribed line |
| PCMR | Pulse Code Modulation Recognizer |

-continued

| | |
|---|---|
| PIN | Personal Identification Number |
| Remote Switch | Switch serving a line being used to obtain remote access. May be the same as the local switch. |
| SDN | Switched services Datakit Network |
| Serving Switch | Switch connecting an Intelligent Peripheral (e.g., via local loops) with & public inter-network (e.g., via trunks to the Public Switched Telephone Network). |
| SOP | Service Ordering Process |
| SS7 | Signaling System 7 - an out of voice band network used to send messages between remote switching equipment. |
| UD | User Directory |
| User | A subscriber to a service (e.g., for providing remote access and control of call forwarding features). |
| User Directory | A database, accessible by an Intelligent Peripheral, which stores a user's service profile. |

In the following detailed description, the function, structure, and operation of the apparatus and methods of the present invention will first be described with reference to a telephony environment, and then, with reference to a more general environment.

Figure 6:
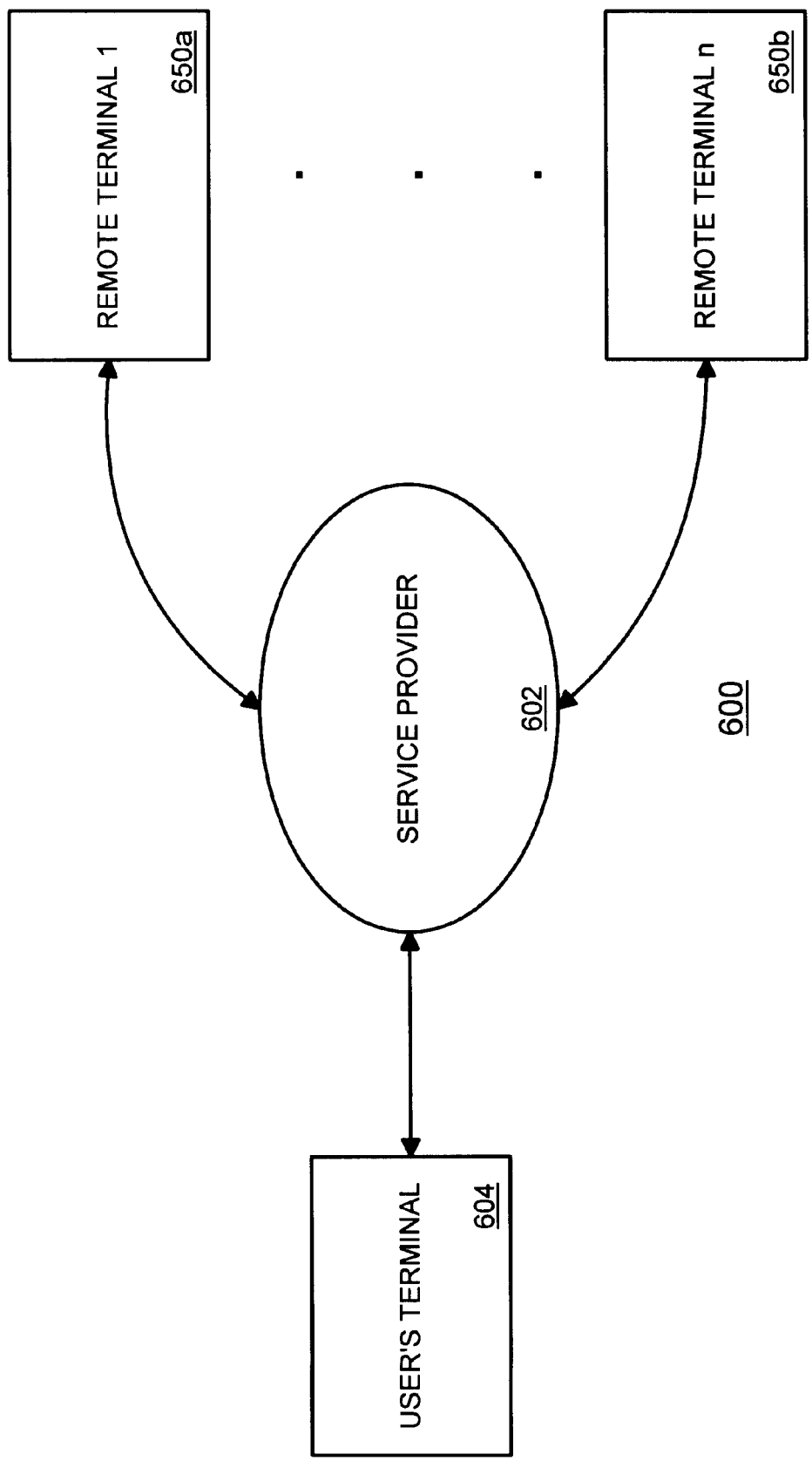
FIG. 6 is a high level block diagram used for illustrating placing, remotely, a service order, making an authorized activation (or pre-authorization) of an ordered service, and accessing and controlling, remotely, service features associated with a terminal.

The function of the present invention in a telephony environment will now be described with reference to FIGS. 6, 7a, and 7b. FIG. 6 is a high level block diagram 600 of a system in which the methods and apparatus of the present invention may be used. Basically, the system 600 includes a user terminal 604 (e.g., a telephone), a service provider 602 (e.g., a TELCO), and other terminals 650 (e.g., other telephones). The service provider 602 may offer enhanced services (e.g., call forwarding, etc.) in addition to a basic service.

Figure 7B:
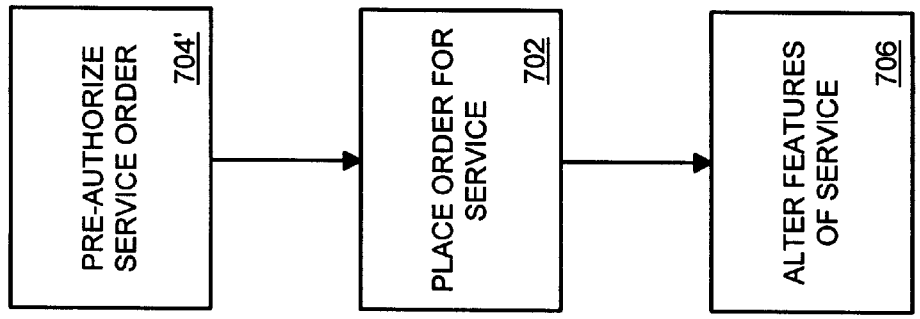
FIGS. 7a and 7b are process flow diagrams which illustrate the way in which a user may order a service, authorize or activate an ordered service, pre-authorize a service order, and alter service features in accordance with the present invention.
Figure 7A:
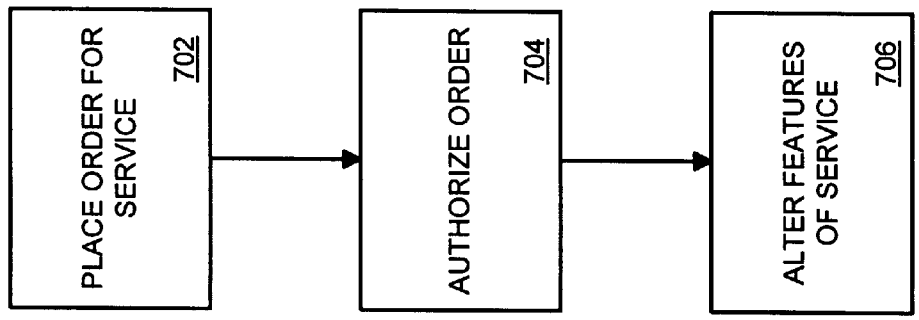

Referring to FIG. 7a, when a user wants an enhanced service, they place an order for the service (e.g., by calling a business office of the service provider 602) 702 and authorize (or activate) the order (e.g., by calling a verification means) 704. Basically, the order for the service 702 may be placed from any terminal (604 or 650), but the authorization of the order 704 must be done from the terminal (604) with which the service is to be associated. Thereafter, certain features of the service may be altered 706. Some features may be altered at any terminal (604 or 650) while other features may only be altered from the terminal (604) with which the service is to be associated. Alternatively, some service alterations may be effected from any terminal (604 or 650) while other service alterations may be placed from any terminal (604 or 650) but must be authorized (or pre-authorized) from the terminal (604) with which the service is associated before such service alterations are effected.

Alternatively, referring now to FIG. 7b, when a user wants an enhanced service, they may pre-authorize the order (e.g., by calling the verification means) 704' and then place an order for the service (e.g., by calling the business office of the service provider 602) 702. As was the case above with respect to FIG. 7a, the order pre-authorization 704' may only be made from the terminal (604) with which the service is to be associated. The service 702 may then be ordered from any terminal (604 or 650). Features of the service may be altered 706 as discussed above with reference to FIG. 7a.

In view of the foregoing, the methods and apparatus of the present invention basically function to (i) process placed service orders, (ii) authorize placed service orders if certain criteria are met, and (iii) pre-authorize, if certain criteria are met, service orders to be placed in the future. The methods and apparatus of the present invention may also function to process requests to alter features of a service.

The structure of the present invention for use in a telephony environment will now be described with reference to FIGS. 1b, 2a, and 2b. FIG. 1b is a high level block diagram of a telephony environment 100 in which the methods and apparatus of the present invention may be used. Basically, an apparatus of the present invention includes an intelligent peripheral 102 and a caller ID capture and user interface unit 130. However, certain embodiments of the present invention do not require the caller ID capture and user interface unit 130.

Both the intelligent peripheral 102 and the caller ID capture and user interface unit 130 may communicate with a serving switch 104 such as a central office switching system. More specifically, the intelligent peripheral 102 may communicate with the serving switch 104 via communication path(s) 146 which may be channelized 64 KBPS (Kilo bits per second) voice channels carried on one or more T1 (i.e., 1.544 MBPS (Mega bit per second) links (e.g., fiber optic or twisted copper pair(s)). These paths 146 may be connected on the line or trunk side of the service switch 104. Such communications over communications path 146 may include voice information and in-band dual tone multiple frequency (DTMF) tones.

The caller ID capture and user interface unit 130 may communicate with the serving switch 104 via communications path 150 which may be one or more plain old telephone system (POTS) voice lines. This path(s) 150 may be connected on the line side of the service switch 104. Such communications may similarly include voice information and DTMF tones.

Although the intelligent peripheral 102 and the caller ID capture and user interface unit 130 may be coupled with separate serving switches 104, it is assumed in the following that these units are in relatively close geographic proximity and thus share the same serving switch 104.

Basically, the serving switch 104 and other central office switching systems 108 have communications paths (e.g., 1200 or 2400 baud links) 140, 142, and 144 to a private information network 106, such as a packet network. The private information network 106 may be used to carry parameter or configuration data associated with lines terminated by the central office switches. Further, the serving switch 104 and the other central office switching systems 108 are coupled (e.g., via trunk side connections 182, 184 and 186) with a public switched telephone network (or "PSTN") 180, through which they can communicate with one another. Although the serving switch 104 and central office switches 108 are shown as being separate from the public switched telephone network 180, these switches 104 and 108 may be thought of as parts of the public switched telephone network.

The serving switch 104 and the other central office switching systems 108 include line side local loops through which telephones, modems, and other station sets are coupled. Moreover, as discussed above with reference to FIGS. 6, 7a, and 7b, the service provider 602 has a business office(s) which a user may call to place a service order. Telephones of the business office(s) may be connected to a central office switch 108 or the serving switch 104. Service orders may also be placed in person, via mail, via e-mail, etc. An operator will enter order information, via a terminal (not shown) to the service order process 122.

Finally, a user may access the public switched telephone network via their own telephone or station set (not shown) or via a remote telephone or station set (not shown). The user's telephone or station set may be coupled, via a local loop, to either a central office switch 108 or the serving switch 104. Similarly, a remote telephone may be coupled, via a local loop, to either a central office switch 108 or the serving switch 104. As far as the methods and apparatus of the present invention are concerned, the switch (104 or 108) to which the user's telephone or station set and the remote telephone or station set is connected does not matter; what matters is that the switch (104 or 108) can communicate caller ID or automatic number identification (or "ANI") data (e.g., a class 5 digital switch such as model no. DMS100 sold by Nortel or model no. 5ESS sold by Lucent).

The elements of the intelligent peripheral 102 will now be described. As shown in FIG. 1b, the intelligent peripheral 102 includes an interactive voice response unit 116, an application processor(s) 112, a data storage unit 113, and a user directory database 114 which are connected to a local area network 118, such as an Ethernet network for example. The intelligent peripheral 102 may also include an application processor input/output interface(s) 110, for managing the communication of data between the application processor(s) 112 and external elements. Although not shown in FIG. 1b, the application processor input/output interface(s) 110 may communicate with the application processor(s) 112 via the local area network 118.

Figure 2A:
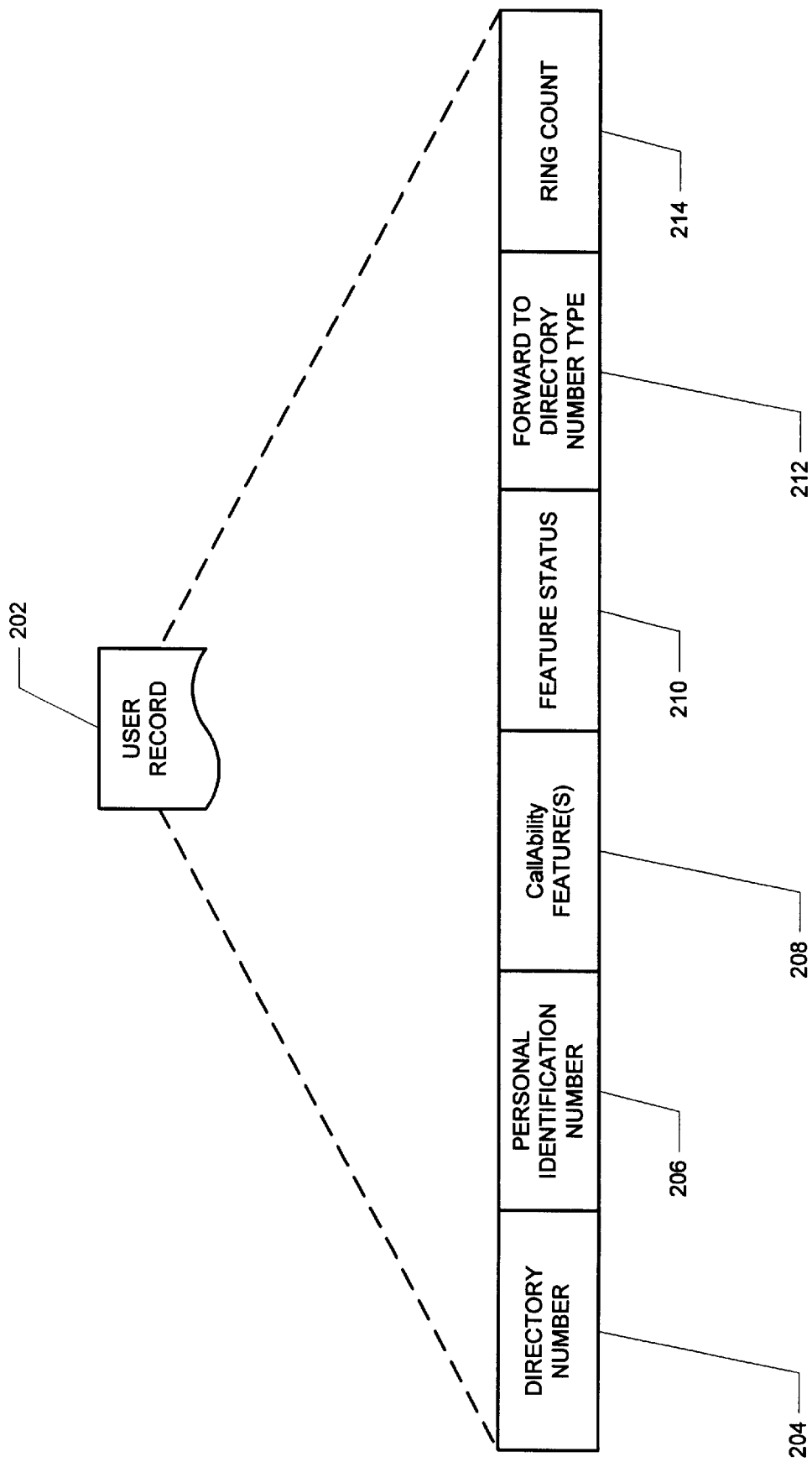
FIG. 2a illustrates an exemplary data structure of a virtual user record.

FIG. 2a illustrates an exemplary format of relevant fields of user records 202 stored in the user directory database 114. Basically, the relevant fields of an exemplary user record 202 include a directory number field 204, a personal identification number (or "PIN") field 206, a CallAbility feature(s) field 208, a feature status field 210, a forward to directory number type field 212, and a ring count field 214.

Valid values will be described for the CallAbility services discussed above, namely the call forward variable (or "CFV"), call forward busy line (or "CFBL"), and call forward don't answer (or "CFDA") services. Generally, the directory number field 204 includes a ten (10) digit telephone number. The PIN field 206 includes a primary four (4) digit personal identification number (or "PIN"), and may also include secondary PINs. The CallAbility feature(s) field 208 will include information indicating which of the CallAbility services (e.g., CFV, CFBL, CFDA, etc.) are associated with the directory number 204. For the CFV service, the feature status field 210 may include an activated/deactivated bit, the forward to directory number type field 212 is set to an alterable ten (10) digit number, and the ring count field 214 is not applicable. For the CFBL service, the feature status field 210 may include an activated/deactivated bit, the forward to directory number type field 212 is set to a fixed ten (10) digit number, and the ring count field 214 is not applicable. Finally, for the CFDA service, the feature status field 210 may include an activated/deactivated bit, the forward to directory number type field 212 is set to a fixed ten (10) digit number, and the ring count field 214 is an alterable value between two (2) and seven (7).

Actually, the user record 202 is a concatenation of two (2) records from the user directory database 114. The first record is a PIN record and includes a directory number field, a PIN field, and other fields not particularly relevant to the present invention. The second record is a CallAbility record and includes a directory number field, a CallAbility feature field, a feature status field, a forward to directory number type field, and a ring count field. The two (2) records are associated with each other based on a matching directory number found in the directory number field. The user directory database 114 may include other records which may be identified by their directory number field.

Figure 2B:
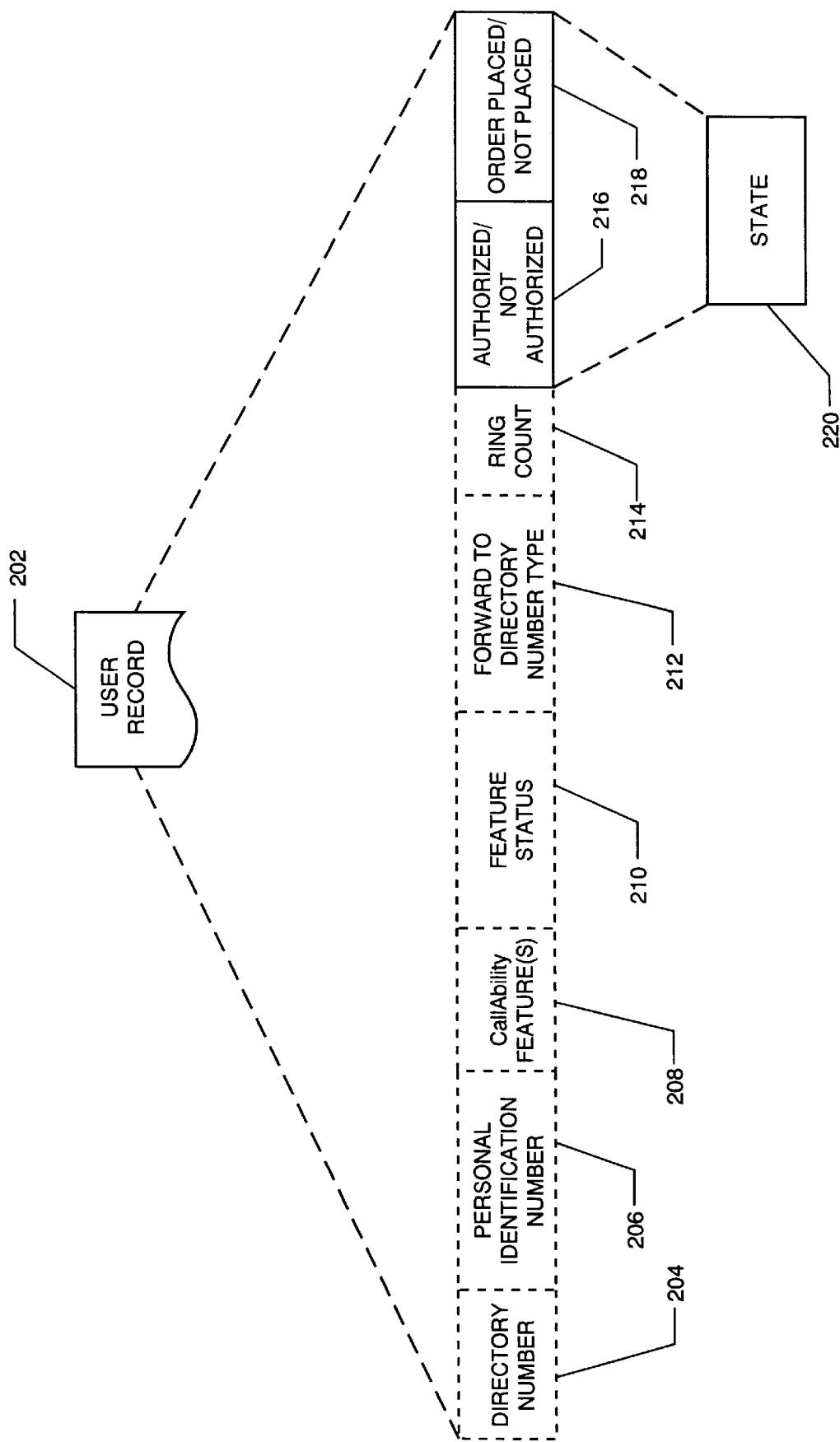
FIG. 2b illustrates an exemplary data structure of a virtual user record, stored in the system of FIG. 1b, and used by the methods and apparatus of the present invention.

FIG. 2b illustrates a user record 202 having an authorized/not authorized field 216 and an order placed/not placed field 218. The fields 216 and 218 may have a one-bit flag for each of the services. That is, there may be an authorized/not authorized flag and an order placed/not placed flag for each of the CFV, CFBL, and CFDA services. Alternatively, these fields 216 and 218 may be one-bit flags corresponding to a single service. Moreover, these fields 216 and 218 may be incorporated into another field (e.g., the ring count field 214). Furthermore, the information in these fields 216 and 218 may be represented by a state field 220, the values of which are set forth in the table below.

| AUTHORIZED? | ORDER PLACED ? | STATE |
| --- | --- | --- |
| No | No | Inactive (00) |
| No | Yes | Inactive Order - Awaiting Authorization (01) |
| Yes | No | Pre-Authorized - Awaiting Order (10) |
| Yes | Yes | Active Order (11) |

Figure 2C:
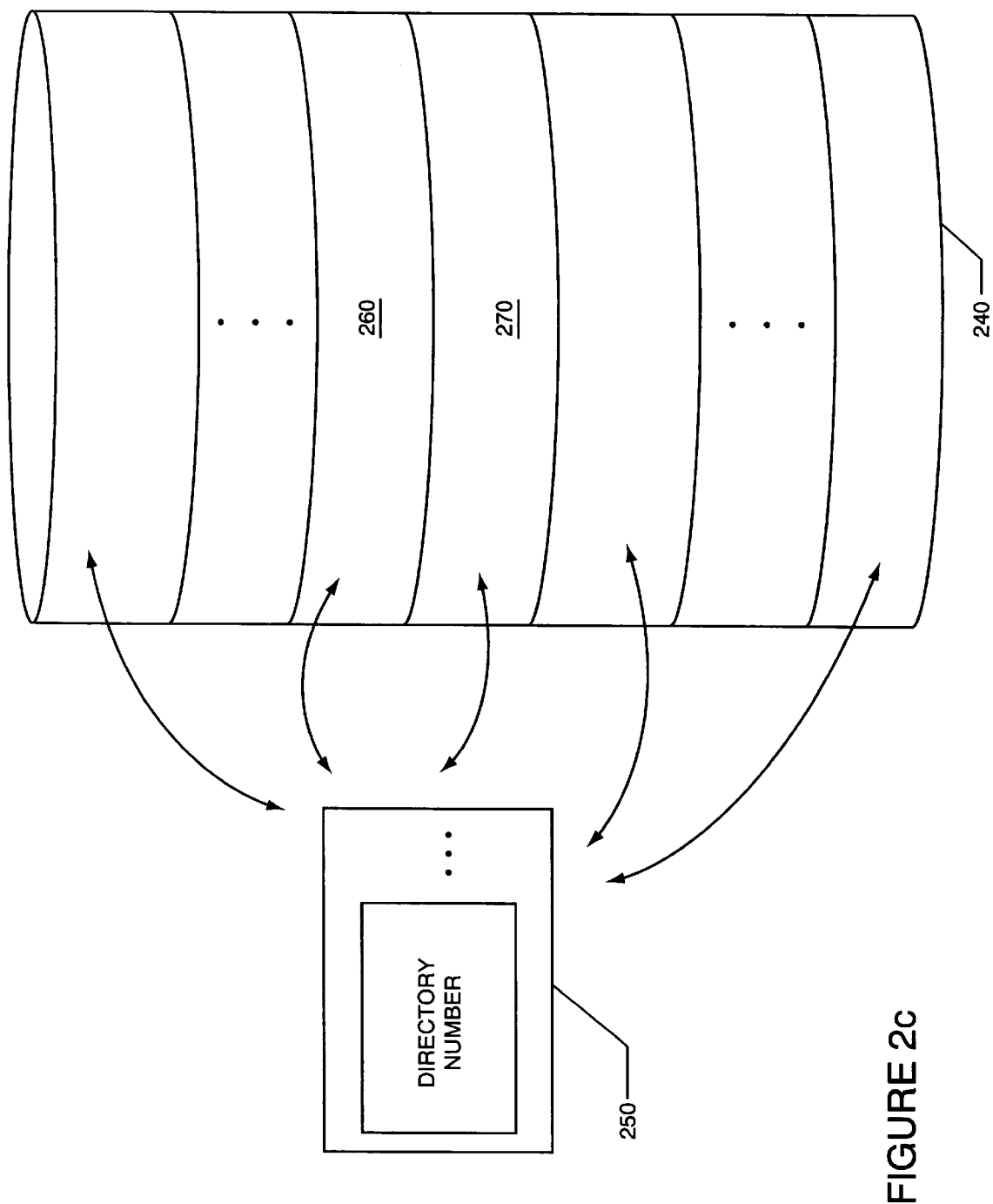
FIG. 2c illustrates a database in which the section of the database in which a simple record is stored is used to infer information.

Alternatively, the fact that an order is placed or pre-authorized can be inferred from a location at which a record is stored. For example, when an authorization precedes an order, a transient record having only a directory number and a time stamp may be created and stored at a particular portion of the data base. Such a transient record may be deleted if an order is not placed within a predetermined time (e.g., one week) of the pre-authorization. Referring to FIG. 2c, a directory number record 250 is stored in section 260 of the database 240 when a service order has been placed and a similar record is stored in section 270 of the database 240 when the service is pre-authorized. Different sections of the database 240 can be used to store orders and pre-authorizations for different services.

The interactive voice response unit 116 includes one or more voice recognition units 120 (such as PCM recognizers for example). The PCMRs 120 of the interactive voice response unit 116 may function to decode voice or DTMF signals and to play voice prompts. The PCMRs 120 may be controlled by the application processor(s) 112 in accordance with instructions stored in the program storage 115 of the data storage unit 113. More specifically, the application processor(s) 112 can either (a) provide voice prompts, stored in section 119 of the data storage unit 113, to the PCMRs based on IVRU scripts stored in section 117 of the data storage unit 113 or (b) may download appropriate voice prompts and/or IVRU scripts, stored in sections 119 and 117, respectively, of the data storage unit 113, to appropriate PCMR(s) 120. FIG. 9, which includes FIGS. 9a, 9b and 9c, is a table which includes exemplary voice prompts. Although control of the interactive voice response unit 116 was described as being centralized at the application processor(s) 112, such control could be provided locally at the interactive voice response unit 116, or in a distributed manner, at each of the PCMRs 120. Each voice recognition unit 120 terminates a T1 link 146 and can handle 24 64 KBPS voice channels.

The user directory database 114 includes user records 202 (or 250), discussed in detail above, which define (or imply) services and information associated with directory (e.g., telephone) numbers. The application processor(s) 112 run program instructions for implementing a process in accordance with the method of the present invention. The application processor(s) 112 may be redundant SUN AP™ processors, having a UNIX operating system platform. In this case, one of the redundant processors is active and one is in a "warm standby" mode in which it is not active but, if the active processor fails (or if it is determined that the active processor will likely fail in the immediate future), the redundant processor can immediately assume processing responsibility. If redundant processors are used, the application processor input/output interface 110 may include a multiplexer or router to route the information to the active processor. Although not shown in FIG. 1b, the application processor(s) 112 may include its own local input means, output means, and storage means, including program storage means.

The application processor input/output interface(s) 110 terminates link(s) 148 from the private information network 106, link(s) 152 from the caller ID capture and user interface unit 130, and link(s) 154 from the switched services datakit network 126. The link(s) 148, as well as the link(s) 154, may be T1 links which carry X.25 protocol packets on synchronous 56 KBPS channels. The link(s) 152 may be RS232 links for carrying serial 9600 baud data.

Referring now to the right side of FIG. 1b, recall that an operator(s) at the service provider's business office(s) enters service orders via a terminal(s) to the service order process 122. The service order process 122, inter alia, transmits service order information to an integrated management system 124 (e.g., via a communications means complying with the X.25, TOPCOM and TCIS (telecommunications interface system) protocols) which, in turn, provides the order to the intelligent peripheral 102 via an internal network 126 (e.g., a switched services datakit network sold by Lucent) of the service provider. Basically, the operation of the service order process 122, the integrated management system 124 and the internal network 126 of the service provider are not particularly relevant to the present invention; what is important is that service order requests reach the intelligent peripheral 102.

The operation of the present invention will now be described. Referring again to FIGS. 7a and 7b, the present invention basically operates to (i) process placed service orders, (ii) determine whether a placed service order is authorized, (iii) activate authorized service orders, and (iv) pre-authorize service orders to be placed in the future. The methods and apparatus of the present invention may also function to process requests to alter features of a service. The operation of the present invention within the context of the telephony system 100 (or 100' or 100") of FIG. 1b will now be described for three (3) alternative embodiments. In each of the three (3) alternative embodiments, the manner in which orders for service are placed is basically the same; only the manner in which service orders are authorized or pre-authorized varies. Thus, the manner in which orders for service are placed will be described first. Then, the manners in which service orders are authorized or pre-authorized will be described with reference to the three (3) alternative embodiments. Finally, the manners in which service features may be altered is described.

The manner in which a service is ordered in accordance with the present invention is now described with reference to FIGS. 1b, 2b and 5. As mentioned above, when a user wishes to order a particular service, they call (or visit, or mail, or e-mail) the business office of the service provider 602. For the purposes of the following discussion, it will be assumed that the ordered service is a CallAbility service discussed in the background of the invention section above. Referring first to FIG. 1b, the service order is entered into a terminal by an operator. The order information is provided, via service order process 122 to the integrated management system 124. The integrated management system 124 forwards the requested order, via the internal network 126 of the service provider 602 and one or more of the link(s) 154, to the application processor input/output interface(s) 110. Upon receiving the service order, the application processor (s) 112 update the user directory database 114 to reflect the requested order.

Referring again to FIG. 2b, when the service order request is received by the application processor(s) 112, the application processor(s) 112 creates a CallAbility record, provides appropriate values in the fields discussed above, and appends or sets an order placed/not placed field or flag 218. Although the order placed/not placed field or flag 218 is shown as a separate field in FIG. 2b, this information may be represented by a one-bit flag within one of the existing CallAbility fields as discussed above with reference to FIG. 2a.

When the user orders the service, such as a CallAbility service for example, unless the service order has been pre-authorized as discussed below, they are informed, by the operator at the service provider's business office for example, that the service order will be inactive (unless they have already pre-authorized the order) and are instructed to activate the order from the telephone or station set with which the service is to be associated. That is, the service can be ordered from any telephone or station set but only may be authorized, and thereby activated, from the telephone or station set with which the service is to be associated.

Figure 4A:
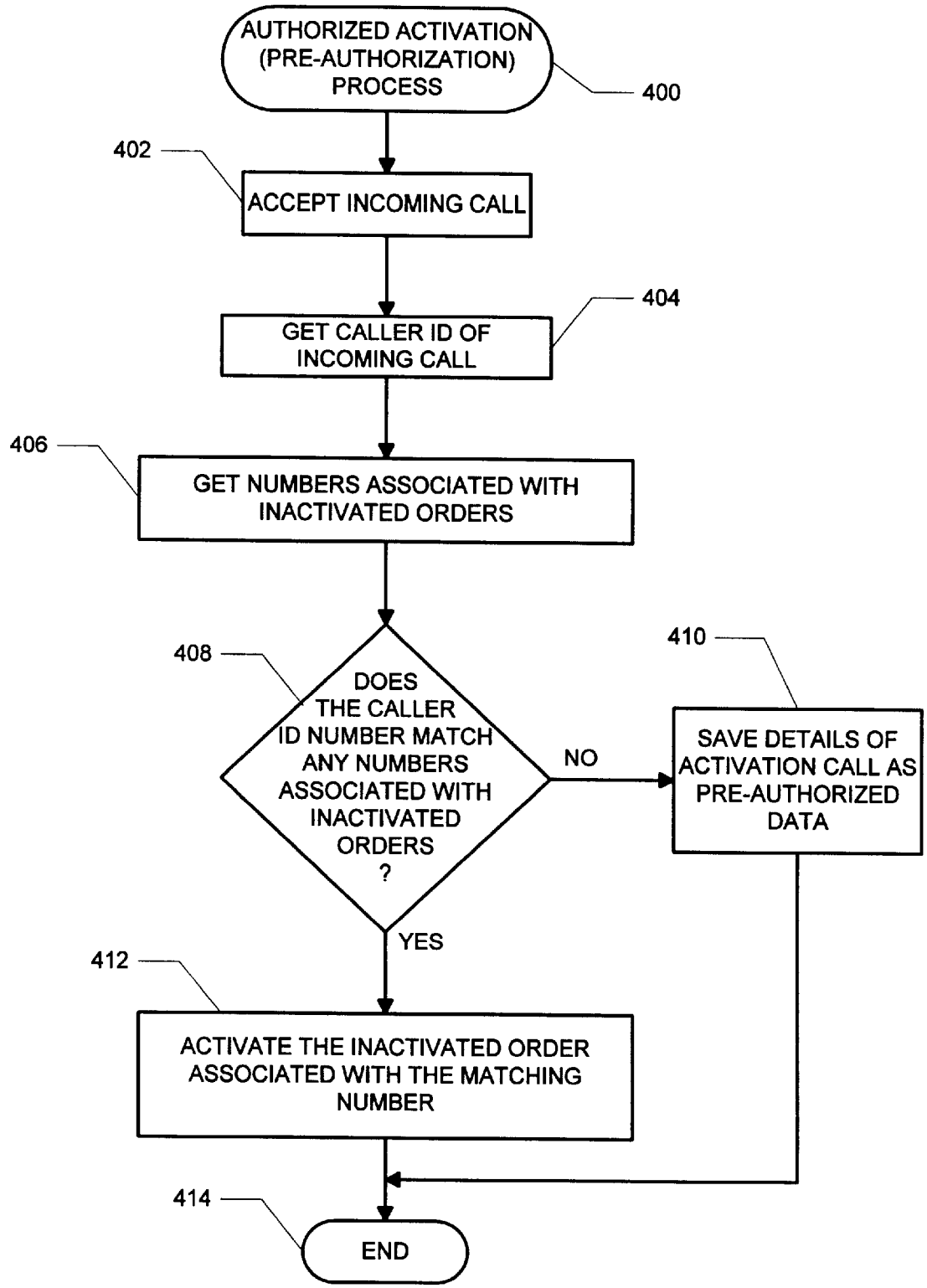
FIG. 4a is a flow diagram of an authorized activation (or pre-authorization) process used in a method of the present invention operating in the telephony environment of FIG. 1b.
Figure 5:
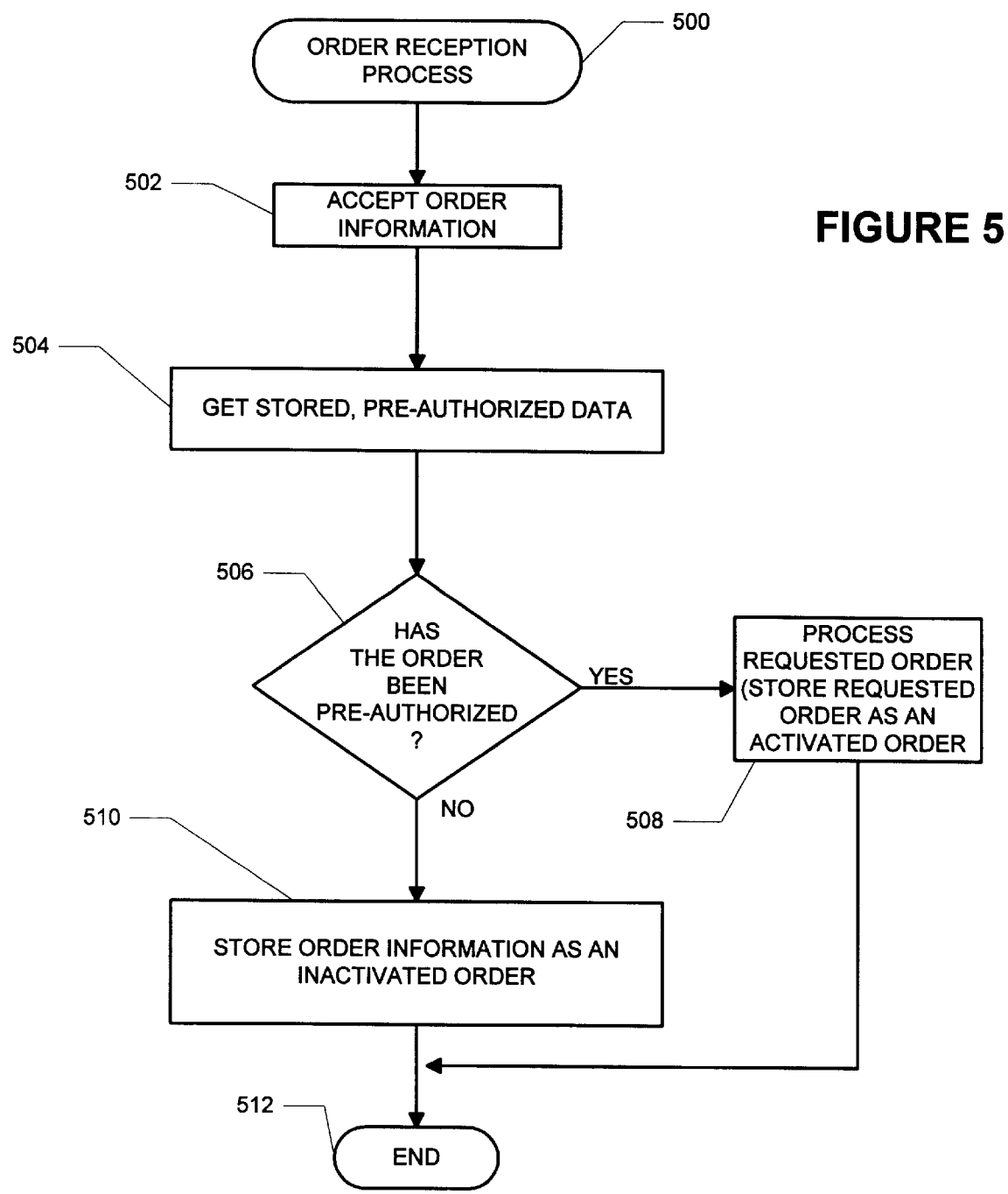
FIG. 5 is a flow diagram of an order reception process used in a method of the present invention.

Referring now to FIG. 5, an order reception process 500 is described. First, as shown in step 502, the application processor(s) 112 accept order information. As described above with reference to FIG. 1b, this order information may be provided to the application processor(s) 112 via an integrated management system 124, a switched services datakit network 126, link(s) 154, and an interface of the application processor input/output interface(s) 110. Next, as shown in step 504, the application processor(s) 112 retrieves user records 202 which indicate that the directory numbers 204 associated therewith are pre-authorized to activate services ordered. Referring back to FIG. 2b, a user record 202 will indicate pre-authorization if (i) the authorized/not authorized field or flag 216 indicates that the service is authorized but the order placed/not placed field or flag 218 indicates that no order has been placed. If the user record 202 has a state field 220, user records 202 having a state field 220 which indicates "pre-authorized—awaiting order" will be retrieved. Alternatively, a section of the database having transient pre-authorization records consisting of a directory number and a time stamp may be searched to see if the directory number with which the service is to be associated matches any of the transient pre-authorization records. As is described below, an authorized activation field or flag 216 is set when (i) a user calls into the caller ID capture and user interface unit 130, (ii) their caller ID matches the number of the telephone or station set with which the service is associated, but (iii) the number does not match any numbers associated with inactive orders. (See e.g., step 410 of FIG. 4a.)

Naturally, rather than retrieving user records 202 based on pre-authorization status, user record(s) 202 associated with the telephone or station set with which the service is associated may be retrieved. If, as shown in step 506, the placed order has been pre-authorized, the request is processed. That is, as shown in step 508, the application processor(s) stores the requested order as an activated order. That is, (a) the authorized/not authorized field or flag 216 will have been set to indicate the order is authorized and the order placed/not placed field or flag 218 will be set to indicate that an order has been placed, or (b) the state field 220 is set to indicate that the order is activated. Otherwise, as shown in step 510, the order information is stored (e.g., in field or flag 218) as an inactive order.

Figure 3A:
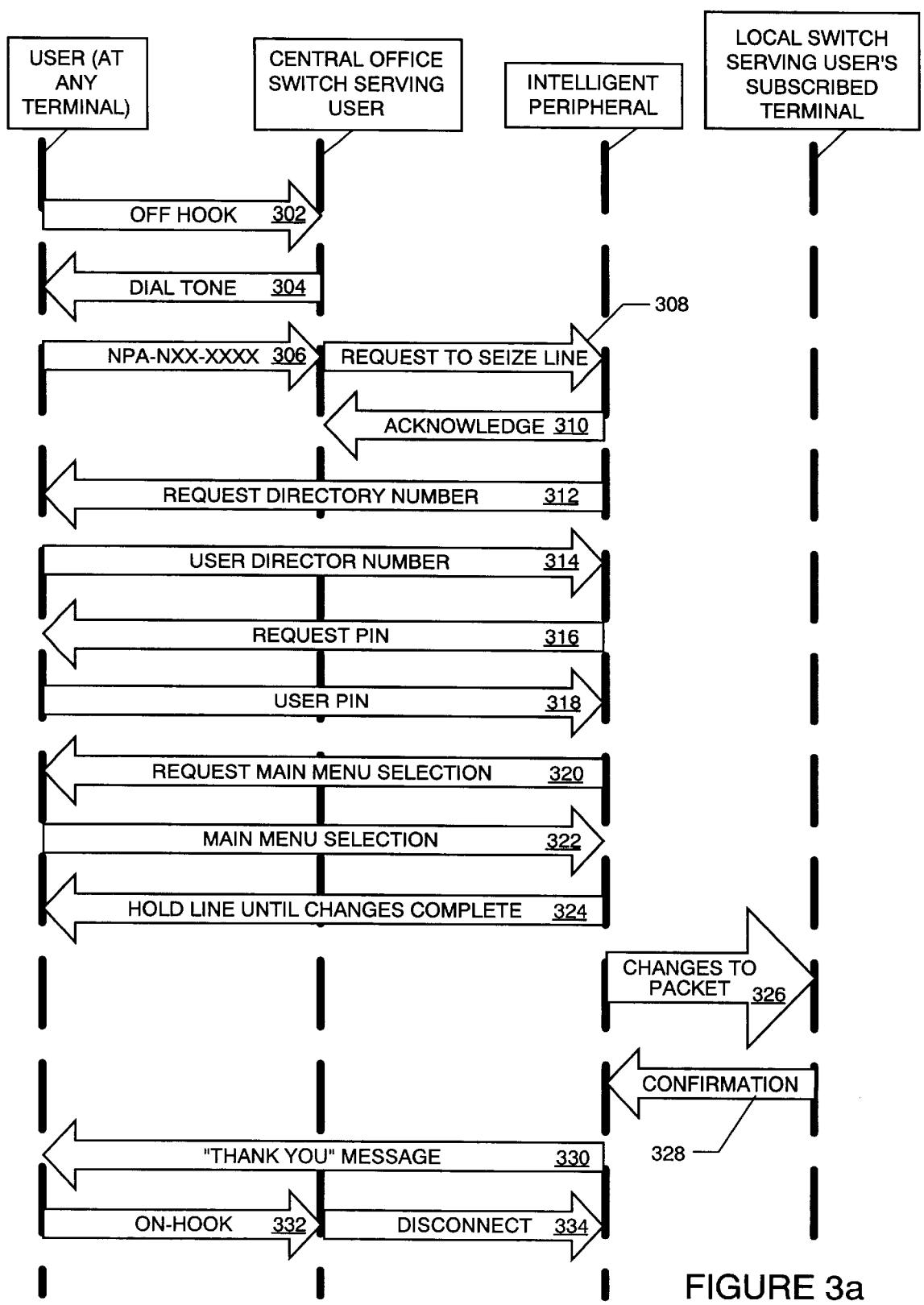
FIG. 3a is an information flow diagram of a process for modifying service features in accordance with the methods and apparatus of the present invention.
Figure 3B:
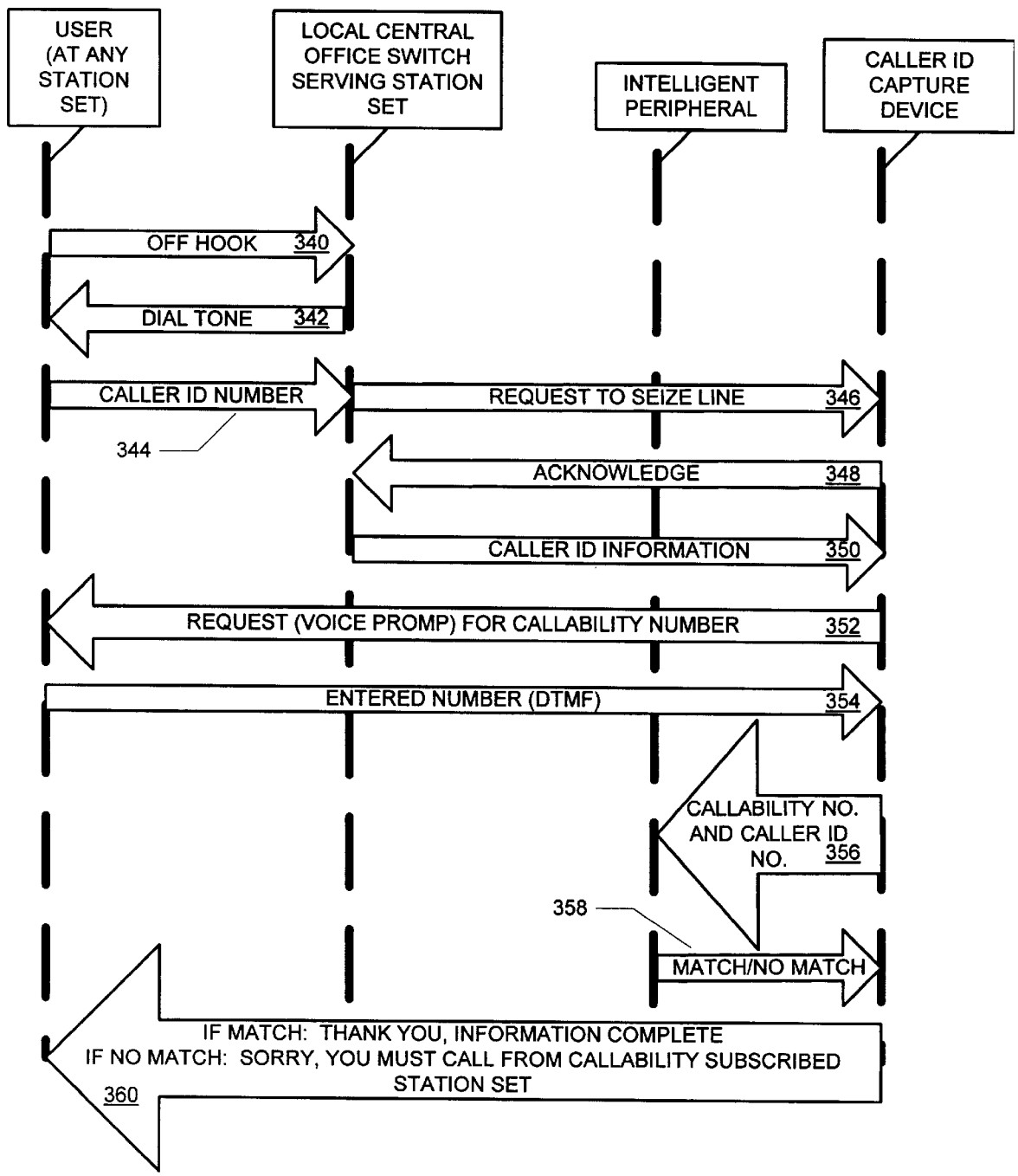
FIG. 3b is an information flow diagram of a first embodiment of the present invention for authorizing (activating) an existing service order or pre-authorizing a service order that has not yet been placed.

In the following, three ways of authorizing or pre-authorizing a service in the context of a telephony environment are described. The first embodiment 100 is described with reference to FIGS. 1b, 3b and 4. The authorization process in a first embodiment will now be described with reference to FIGS. 1b, 3b, and 4a. Referring first to FIG. 1b, the user calls the telephone number of the caller ID capture and user interface unit 130 to activate the inactive order (or to pre-authorize a service order to be placed). More specifically, as shown in FIG. 3b, the user goes off-hook 340 and the local central office switch returns a dial tone 342. The user then dials the number of the caller ID capture and user interface unit 130. This information is forwarded to the local central office switch in message 344 (e.g., as DTMF signals) and forwarded to the caller ID capture and user interface unit 130 as a request to seize a line 346. If a line is available, the caller ID capture and user interface unit 130 will return an acknowledge signal 348. At this point, a voice connection is established between the user and the caller ID and capture user interface unit 130. Referring to the authorized activation (or pre-authorization) process 400 of FIG. 4a, this step of accepting an incoming call is shown a box 402. Otherwise, if a line is not available, a busy signal (not shown) is returned to the user.

Next, as shown in step 404, the caller ID capture and user interface unit 130 gets the caller ID of the incoming call. More specifically, referring back to FIG. 3b, the local central office switch forwards caller ID information 350 to the caller ID capture and user interface unit 130. The caller ID information 350 may also include a time-stamp. Thereafter, the caller ID capture and user interface unit 130 forwards a request 352 for the telephone number of the station set to which the service is associated. The request 352 may be in the form of a voice prompt. (See e.g., Prompt No. 2 of FIG. 9a.) In response to the request 352, the user will then enter the digits of the telephone number of the station set with which the service is associated. This information 354, which may be in-band DTMF signals for example, is forwarded to the caller ID capture and user interface unit 130.

The caller ID and user interface unit 130 then forwards a message 356 including the number entered by the user (e.g., the number of the telephone or station set with which the service, e.g., CallAbility, is associated) and the captured caller ID (and perhaps the time stamp) to the intelligent peripheral 102. More specifically, referring back to FIG. 1b, this message 356 may be forwarded to the application processor(s) 112 via link(s) (e.g., RS-232, 9600 Baud, serial line) 152 and an appropriate one of the application processor input/output interface(s) 110. The application processor(s) 112 then determines whether or not the numbers in the message 356 match or not. A match/no match message 358 is returned to the caller ID capture and user interface unit 130. Naturally, this match/no match determination could be made by the caller ID capture and user interface unit 130 itself, in which case, if the numbers matched, a message including the telephone number (and perhaps the time stamp) would be forwarded to the application processor(s) 112 of the intelligent peripheral 102.

In any event, if the entered number and the captured caller ID number match, the caller ID capture and user interface unit 130 sends a message (e.g., a voice message) 360 to the user thanking them and informing them that the information needed to activate (or pre-authorize) their order is complete. Referring now to FIG. 4a, again, if there is a match, as shown in step 406, the application processor(s) 112 will retrieve any numbers associated with inactivated orders from the user director database 114. Referring back to FIG. 2b, this is done by retrieving user records 202 with an order placed/not placed field or flag 218 indicating that an order was placed but with an authorized/not authorized field or flag 216 indicating that authorization has not yet been given. If the user records 202 include a state field 220, user records 202 having a state field 220 indicating "inactive order—awaiting authorization" are retrieved. Alternatively, the application processor(s) 112 will retrieve any user records 202 having (i) a directory number field 204 matching the entered number and (ii)(a) an order placed/not placed field or flag 218 indicating that an order was placed but an authorized/not authorized field or flag 216 indicating that authorization has not yet been given or (b) a state field 220 indicating "inactive order—awaiting authorization".

Next, as shown in step 408, the application processor(s) 112 determines whether or not the captured caller ID number matches any of the directory numbers 204 of the user records 202 having inactive orders. If there is a user record 202 associated with an inactive order (as indicated by fields or flags 216 and 218 or state field 220) having a directory number 204 matching the captured caller ID number, then, as shown in step 412, the inactive order is activated. That is, the authorized/not authorized field 216 is set to indicate that the order has been authorized or the state field 220 is set to indicate that the order is activated. If, on the other hand, there is no user record 202 associated with an inactive order and having a directory number 204 matching the captured caller ID number, then, as shown in step 410, the details of the activation call are saved as pre-authorized data. More specifically, referring to FIG. 2b, the authorized/not authorized field or flag 216 is set to indicate that the directory number 204 is pre-authorized to activate a service if an order for a service is placed (e.g., by calling the business office of the service provider). If the user record 202 has a state field 220, that field is set to indicate that a service is "pre-authorized—awaiting order". If the caller ID information 350 included a time stamp, the time stamp may be used as a reference point for a pre-determined time period within which the order must be placed. If the order is not placed within the predetermined time period, the authorized/not authorized field or flag 216 is set to indicate no authorization or the state field 220 is set to indicate an "inactive" state.

Figure 3C:
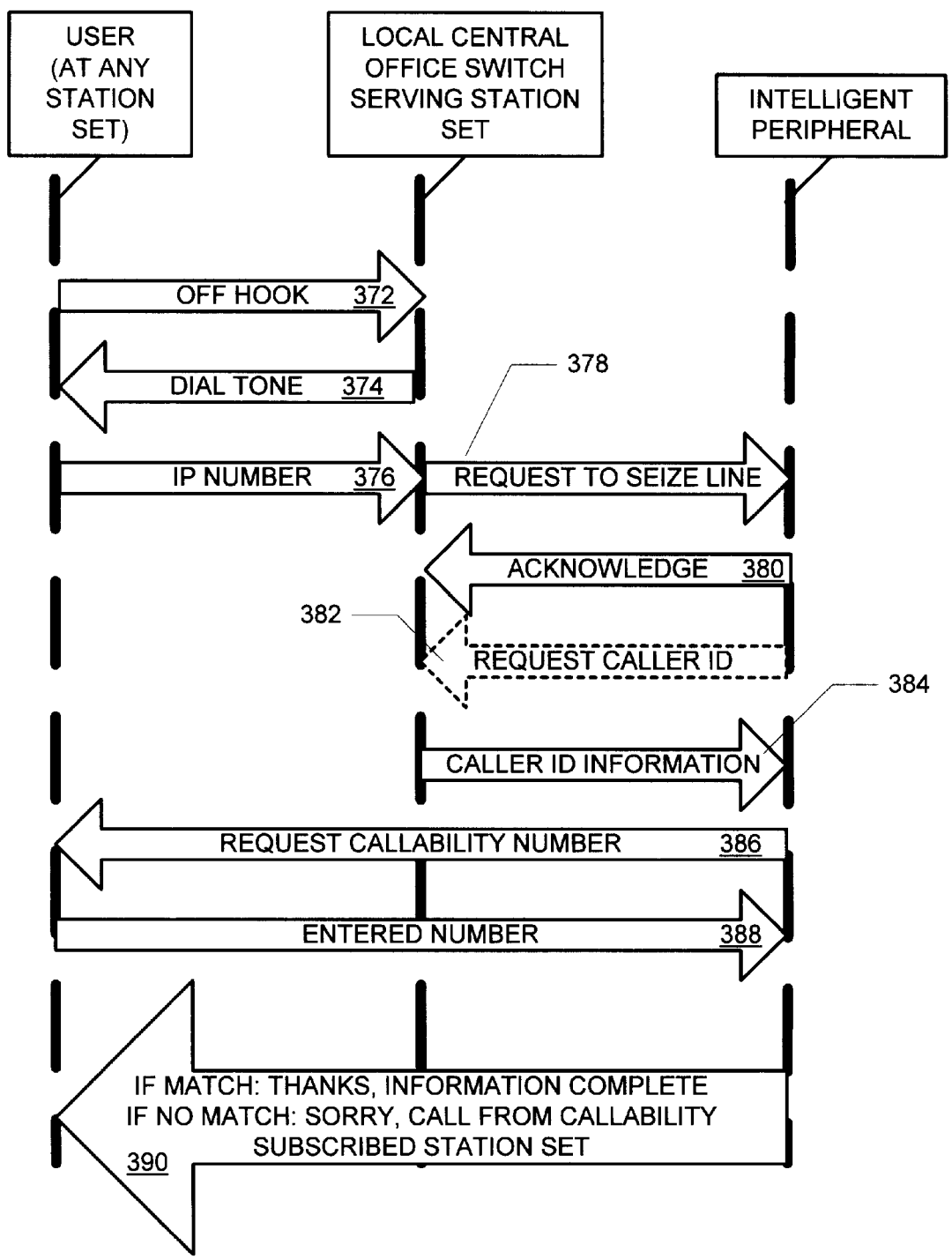
FIG. 3c is an information flow diagram of a second embodiment of the present invention for authorizing (activating) an existing service order or pre-authorizing a service order that has not yet been placed.

Thus, the ordering of services and the authorization (or pre-authorization) of services has been described. Now, the service order authorization (or pre-authorization) process 400 will be described in two alternative embodiments. FIG. 3c illustrates the data flow of a service order authorization (or pre-authorization) process 400 in a system 100' in which a voice recognition unit, such as a PCM recognizer (or "PCMR") for example, 120 includes a caller ID capture capability. In this embodiment, the caller ID capture and user interface unit 130 and links 150 and 152 can be eliminated. More specifically, some PCMRs can access an automatic number I.D. value via a signaling system 7 (or "SS7") network. Although those skilled in the art are familiar with SS7, SS7 will be briefly described below for the reader's convenience.

In the past, most signaling was carried out "in-band" (i.e., it went along and occupied the same circuits as those which carry voice conversations). Such in-band signaling was usually carried out with multifrequency or single frequency signals. Unfortunately, many toll calls are not completed because the called phone does not pick up or is busy. The circuit time used in in-band signaling is substantial, expensive and wasteful. Out-of-band signaling (such as signaling system 7, or "SS7") uses circuit(s) separate from voice circuits, for signaling functions. Many present day inter-office networks now use out-of-band signaling such as SS7 signaling to "set up" (or establish) and "tear down" (or terminate) a call. SS7 is also used to send messages between remote switching equipment. SS7 is advantageous because it uses separate circuits for signaling and voice data.

Referring now to FIG. 3c, in the second embodiment of the present invention, in the context of a telephony environment 100', to authorize (or pre-authorize) a service order, the user places a call to the intelligent peripheral 102. More specifically, the user goes off-hook and a signal 372 indicating the off-hook status of the user is forwarded to the local central office switch. In response, the local central office switch returns a dial tone signal 374. The user dials the number of the intelligent peripheral and DTMF signals 376 for example, relay the dialed number to the local central office switch. In response, the local central office switch submits a request 378 to seize a line (e.g., a channel of a T1 link 146) to the interactive voice response unit 116 of the intelligent peripheral 102. If a line is available, an acknowledge signal 380 is returned. At this point, a voice connection is established between the user and the PCMR 120. The enhanced PCMR 120 then issues a request 382 (e.g., via SS7) for the caller ID of the user. This request 382 is shown in dashed lines because if the central office switch automatically forwards caller ID information as an automatic number identification (or "ANI"), a request for caller ID information would not be necessary. The local central office switch returns the caller ID of the user (e.g., via SS7) in message 384. Then, like the caller ID capture and user interface unit 130 discussed above, the PCMR 120 of the intelligent peripheral 102 requests the number of the telephone or station set with which the service is associated from the user. This request 386 may be in the form of a voice prompt. (Compare with message 352 of FIG. 3b.) The voice prompt (See e.g., Prompt No. 2 of FIG. 9a or Prompt No. 64 of FIG. 9c) may be retrieved from stored s voice prompts 119 by the application processor(s) 112 and provided to the interactive voice response unit 116. In response to the request 386, the user will then enter the digits of the telephone number of the station set with which the service is associated. This information 388, which may be in-band DTMF signals for example, is forwarded to the PCMR 120 of the intelligent peripheral 102. (Compare with message 354 of FIG. 3b.)

The caller ID of the user and the entered number of the telephone or station set with which the service is associated are forwarded, e.g., via the local area network 118, to the application processor(s) 112. If the numbers match, the PCMR 120 returns a message 390 to the user thanking the user and indicating that the information required for authorizing (or pre-authorizing) the service order is complete. (See e.g., Prompt No. 66 of FIG. 9c.) The application processor(s) 112 carries out the remaining steps (e.g., steps 406, 408, 410, and 412) of the authorized activation process 400 described above with reference to FIG. 4a. Otherwise, if the numbers do not match, the PCMR 120 returns a message 390 to the user stating that they must call from the telephone or station set with which the service is associated to authorize (or pre-authorize) the service order. (See e.g., Prompt No. 67 of FIG. 9c.)

Figure 3D:
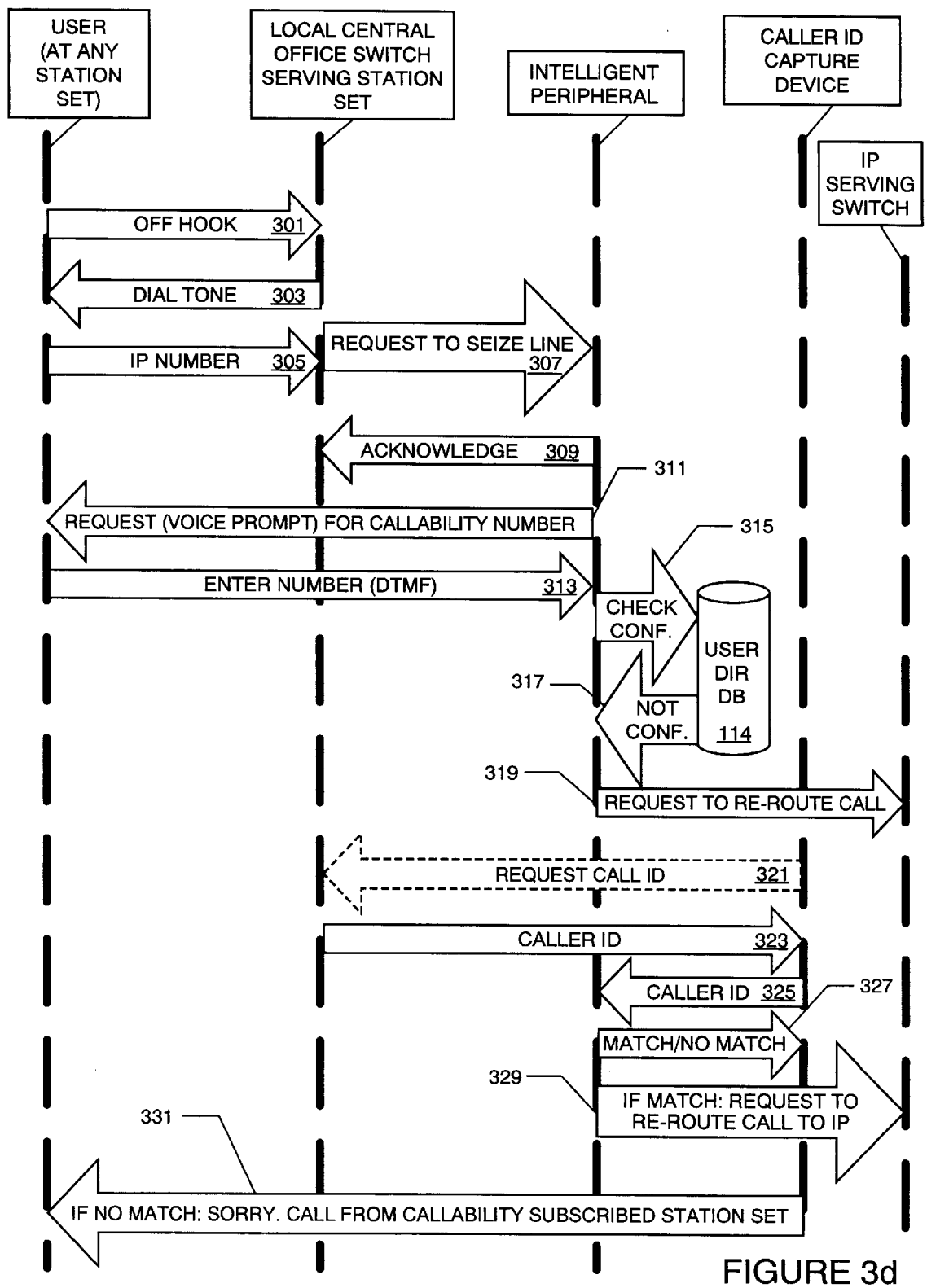
FIG. 3d is an information flow diagram of a third embodiment of the present invention for authorizing (activating) an existing service order or pre-authorizing a service order that has not yet been placed.

FIG. 3d illustrates the information flow of a service order authorization (or pre-authorization) process 400 in a third embodiment of the present invention, in the context of a telephony environment 100". In this third embodiment 100", the PCMRs 120 cannot capture caller ID information but in which the user need not call the caller ID capture and user interface unit 130. In this case, the caller ID capture and user interface unit 130 may be replaced with a unit which can only perform a caller ID capture function; all other interaction with a calling user may take place via a PCMR 120. The authorization (or pre-authorization) process in such a system 100" is now described with reference to FIG. 3d. First, the user calls the intelligent peripheral 102. More specifically, as was the case in the embodiment described with reference to FIG. 3c, the user goes off-hook and a signal 301 indicating the off-hook status of the user is forwarded to the local central office switch. In response, the local central office switch returns a dial tone signal 303 to the user. The user then dials the number of the intelligent peripheral and DTMF signals 305, for example, relay the dialed number to the local central office switch. In response, the local central office switch submits a request 307 to seize a line (e.g., a channel of a T1 link 146) to the interactive voice response unit 116 of the intelligent peripheral 102. If a line is available, an acknowledge signal 309 is returned. At this point, a voice connection between the user and the PCMR 120 is established. The PCMR 120 then issues a request 311 to the user for the number of the telephone or station set with which the service is associated. This request 311 may be in the form of a voice prompt. (See e.g., Prompt No. 2 of FIG. 9a or Prompt No. 64 of FIG. 9c.) Again, the voice prompt may be retrieved from stored voice prompts 119 by the application processor(s) 112 and forwarded to the interactive voice response unit 116. In response to the request 311, the user will then enter the digits of the telephone number of the station set with which the service is associated. This information 313, which may be in-band DTMF signals for example, is forwarded to the PCMR 120 of the intelligent peripheral 102. Thus far, the messages or signals 301, 303, 305, 307, 309, 311, and 313 correspond to messages or signals 372 374, 376, 378, 380, 386, and 388, respectively, of FIG. 3c.

Next, the intelligent peripheral 102 submits a confirmation check 315 to the user directory database 114. More specifically, the application processor(s) 112 of the intelligent peripheral 102 will check the authorized/not authorized field or flag 216 (or the state 220) of the user record 202 to determine whether or not the ordered service has already been authorized. In this example, it is assumed that the ordered service (or service to be ordered) has not yet been authorized. Thus, the fact that the ordered service (or service to be ordered) has not yet been authorized is returned in message 317.

Next, the intelligent peripheral 102 instructs the serving switch 104 to re-route (or forward) the call, via a channel of the T1 link 146, the serving switch 104, and loop 150 for example, to the caller ID capture and user interface unit 130. Assuming a line is available, the caller ID capture and user interface unit 130 then submits a request 321 for the caller ID of the user to the local central office switch. The request 321 is shown in dashed lines because if caller ID information is automatically forwarded, the request 321 would not be necessary. In response, the local switch transmits the caller ID 323 of the user to the caller ID capture and user interface unit 130. Thereafter, the caller ID capture and user interface unit 130 forwards the caller ID 325 of the user, via the link 152 and an interface of the application processor input/ output interface(s) 110 for example, to the application processor(s) 112 of the intelligent peripheral 102. The digits of the telephone number 313 of the station set with which the service is associated, previously entered by the user in response to a request 311 by the PCMR 120 were already provided to the application processor(s) 112, via the LAN 118 for example, during the check to determine whether the order had already been authorized. Otherwise, the digits of the telephone number are again sent by the PCMR 120 to the application processor(s). The application processor(s) 112 then determines whether or not these values match and forwards a match/no match message 327 to the caller ID capture and user interface unit 130. If the values match, the application processor(s) 112 will also carry out steps 406, 408, 410, and 412 of the authorized activation process 400 described above. Further, if the values match, the caller ID capture and user interface unit 130 will instruct the serving switch 104 to reroute (e.g., forward) the call 329, via loop 150, serving switch 104, and a channel of a T1 link 146 for example, back to the PCMR 120 of the intelligent peripheral 102. In this case, the PCMR 120 will inform the user that the authorization is complete. (See e.g., Prompt No. 66 of FIG. 9c.) Alternatively, the caller ID capture and user interface unit 130 may provide this message and terminate the call. If, on the other hand, the values do not match, the caller ID capture and user interface device returns a message 331 to the user noting that they must call from the telephone or station set with which the ordered service is (to be) associated. (See e.g., Prompt No. 67 of FIG. 9c.) In each of the above authorization (or pre-authorization) procedures, the PCMR 116 or the caller ID capture and user interface unit 130 may request a PIN number so that the application processor(s) 112 may check the entered PIN against the PIN field 206 of the user record 202 for further security.

Further, in each of the above authorization (or pre-authorization) procedures, it is possible that the caller has a caller ID block feature enabled (e.g., by touching #67 in the NYNEX calling region) for purposes of privacy. If this is the case, the caller will be asked to (i) hang up, (ii) disable the caller ID block feature (e.g., by touching *82 in the NYNEX calling region), and (iii) call back. This aspect of the present invention may be referred to as "anonymous call rejection".

Having described the manner in which (i) a service is ordered and (ii) a service order is authorized (activated) or pre-authorized, the manner in which features of a service are modified is now described with reference to FIG. 3a.

First, a user at any telephone or station set goes off-hook. This off-hook state is forwarded to a central office switch serving the user in signal 302. In response, the central office switch returns a dial tone 304. The user then enters the number of a PCMR 120 of the interactive voice response unit 116 of the intelligent peripheral 102. This information, which may be DTMF signals for example, 306 is sent to the central office switch. In response, the central office switch sends a request 308 to seize a line (e.g., a voice channel of a T1 link 146) to a PCMR 120 of the intelligent peripheral 102. If a line is available, an acknowledge signal 310 is returned. At this point, a voice connection is established between the PCMR 120 and the user.

The PCMR 120 then transmits a request 312 for the directory number of the telephone or station set with which the service to be altered is assigned. This request may be a voice prompt. (See e.g., Prompt No. 2 of FIG. 9a or Prompt No. 65 of FIG. 9c.) The user then enters the number of the telephone or station set. This information, which may be DTMF signals for example, 314 is sent to the PCMR 120. The PCMR 120 then transmits a request 316 for the personal identification number (PIN) for the telephone or station set with which the service to be altered is assigned. Again, this request may be a voice prompt. (See e.g., Prompt No. 7 of FIG. 9a or Prompt No. 65 of FIG. 9c.) The user then enters their PIN. This information, which may be DTMF signals for example, 318 is sent to the PCMR 120. In the following, it is assumed that the user entered the correct PIN.

As shown in messages 320 and 322 an interactive session ensues, in which prompts (e.g., voice prompts; see e.g., FIG. 9) from the PCMR 120 are answered by the user (e.g., with DTMF signaling) so that the user may navigate through menus of service feature alterations. When the user is done with their service feature alterations, they so indicate. At this point, the PCMR 120 holds the line 324 while the application processor(s) 112 of the intelligent peripheral 102 sends changes 326, via the private information network 106 (if necessary), to central office switch (108a, 108b, or 104) associated with the telephone or station set with which the service is associated. The local central office switch associated with the telephone or station set with which the service is associated sends a confirmation message 328 to the intelligent peripheral 102 when the changes are complete. Moreover, the application processor(s) 112 of the intelligent peripheral 102 updates the appropriate fields of the user record(s) 202 to reflect the entered changes.

When the appropriate changes at the local central office switch and to the user record 202 have been made, the PCMR 120 of the intelligent peripheral 102 sends a message 330 to the user thanking them and indicating that the service feature alterations have been completed. (See e.g., Prompt No. 34 of FIG. 9b.) Finally, when the user hangs up, an on-hook signal 332 is forwarded to the central office switch which, in turn, disconnects 334 the line to the PCMR 120 of the intelligent peripheral 102.

With the present invention, since the services ordered have already been pre-authorized, all service feature modifications can take place from any telephone and the chance of fraud is reduced. The present invention may be configured to require pre-authorization for permitting certain service feature alterations and for requiring such alterations to be made within a predetermined time period. Thus, for example, the business traveler may be required to pre-authorize Call Forward Variable forwarding number alteration requests from their own telephone. They may further restrict the time period (e.g., one week) within which such alterations remain pre-authorized.

Having described the present invention in the context of ordering services from a service provider in a telephony environment, the present invention will now be described in the context of a more general environment.

The function of the invention in the more general environment is similar to that in the telephony environment of FIG. 1b. That is, the present invention functions to (a) authorize (and thus activate) a previously placed order (e.g., for a service), (b) pre-authorize an order (e.g., for a service) to be placed (e.g., within a predetermined time), (c) place an order, and (d) permit attributes of the thing (e.g., service) ordered to be changed.

Figure 1A:
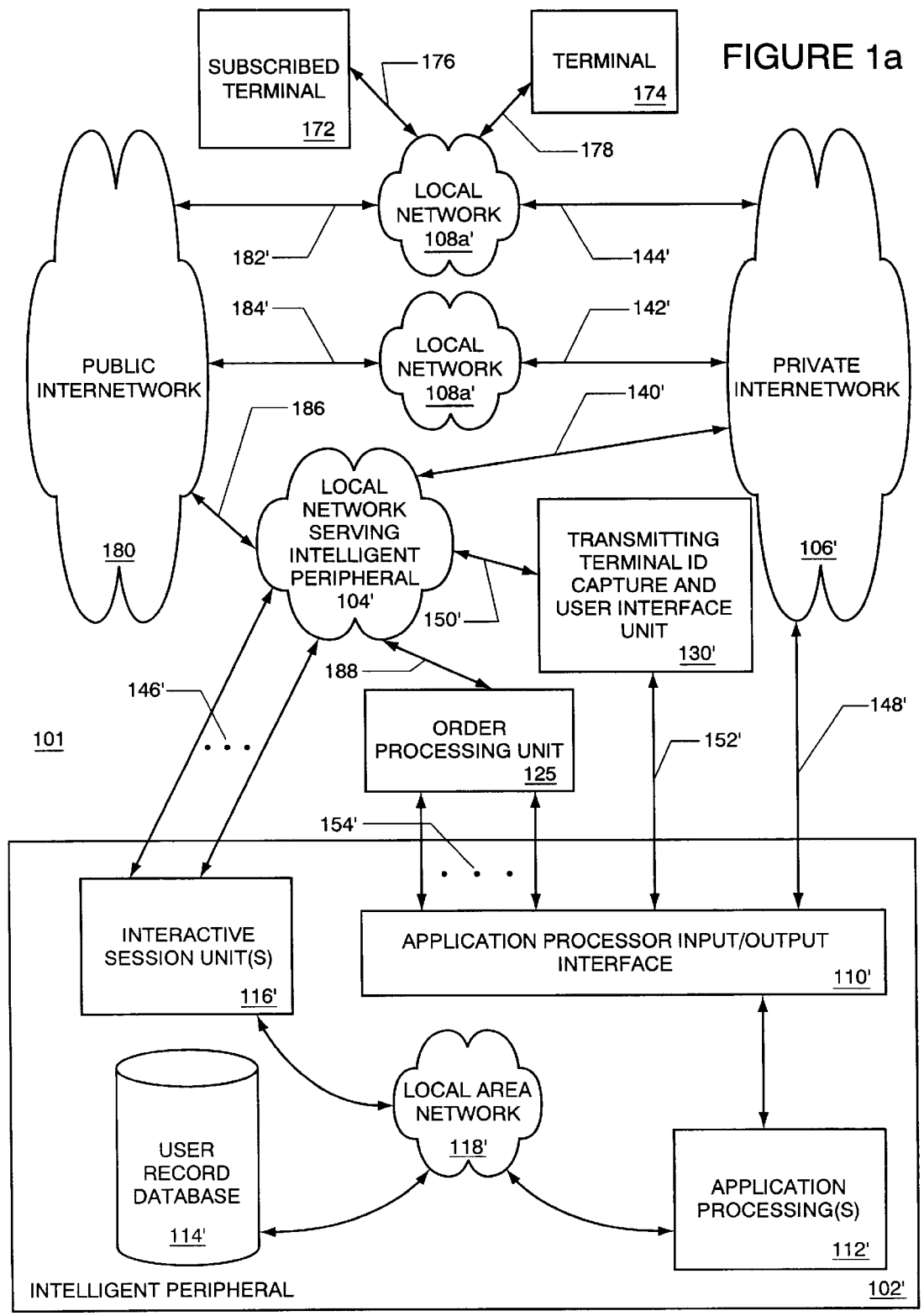
FIG. 1a is a high level block diagram of an environment in which the methods and apparatus of the present invention may be used.
Figure 1B:
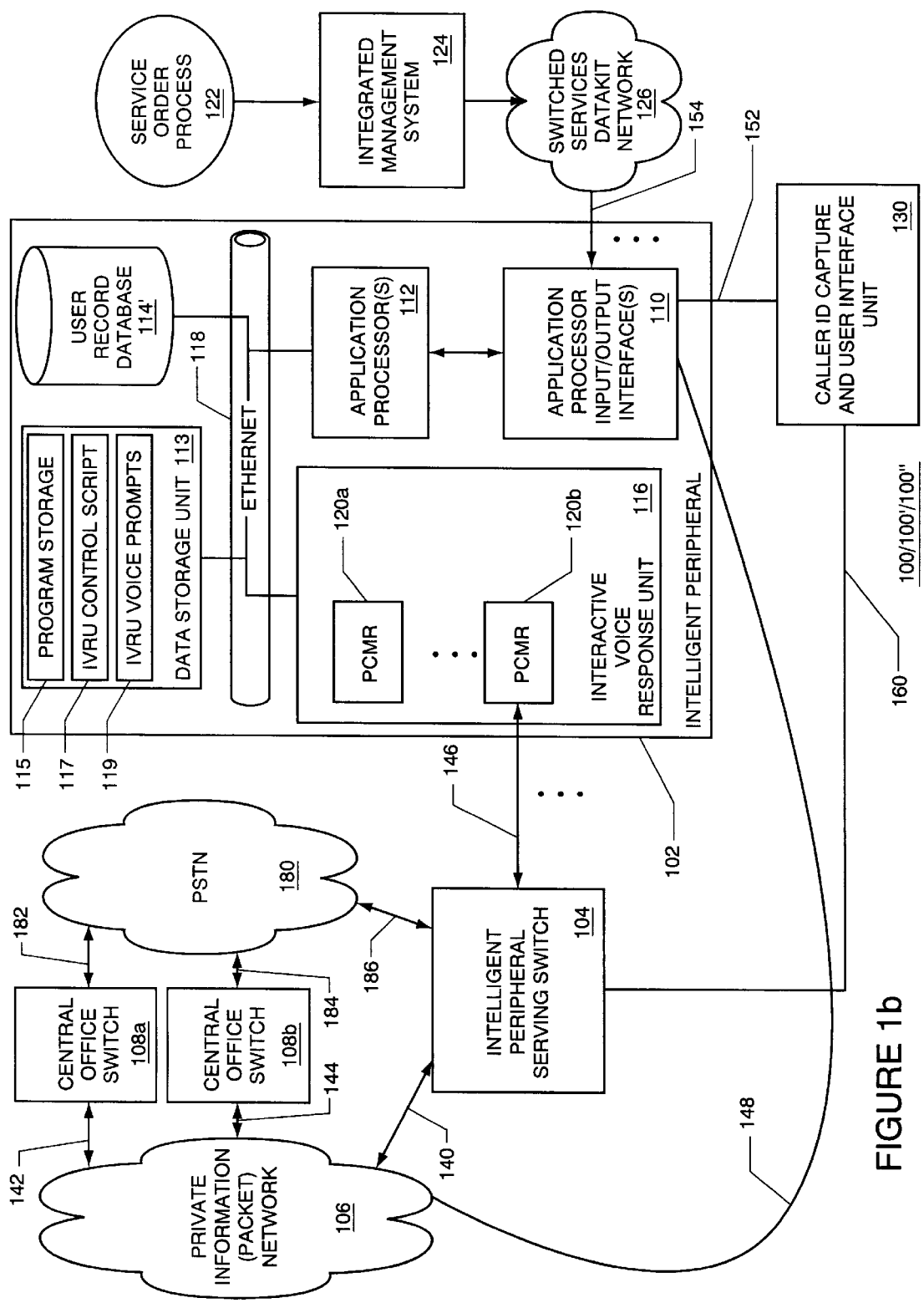
FIG. 1b is a high level block diagram of a telephony environment in which the methods and apparatus of the present invention may be used.

FIG. 1a illustrates a more general environment 101 in which the present invention may operate. The elements of FIG. 1a will be described and compared to related elements of FIG. 1b. One or more local networks 108' can communicate with a public inter-network 180' via communications paths 182' and 184. The central office switches 108 of FIG. 1b can be thought of as a type of local network 108'. The trunk side connections 182, 184 and 186 of FIG. 1b may be thought of as a type of communication path. The public switched telephone network 180 of FIG. 1*b* may be thought of as a type of public inter-network.

The local networks 108' may also be coupled with a private inter-network 106' via communications paths 142' and 144'. The private information network 106 of FIG. 1*b* can be thought of as a type of private inter-network 106'. The local networks 108' may include terminals, such as a subscribed terminal 172 and a terminal 174 which communicate with the network via communications paths 176 and 178. If the general environment 101 of FIG. 1*a* was a telephony environment 100, the communications paths 176 and 178 could be local loops of a central office, such local loops including twisted copper pairs, and the terminals 172 and 174 could be telephones or station sets.

Similarly, a local network 104, which happens to serve the intelligent peripheral 102', may communicate with the public inter-network 180 via communications path 186' and may communicate with the private inter-network 106' via communications path 140'. The central office serving switch 104 of FIG. 1*b* can be thought of as a type of local network 104'. Although subscribed terminal 172 is shown as being part of the local network 108*a*', it could be a part of the other local networks 108*b*' or 104'. Similarly, the other local networks 108*b*' and 104' may also include other terminals.

The intelligent peripheral 102' includes an application processor input/output interface(s) 110', an application processor(s) 112', a user record database 114' and an interactive session unit(s) 116' which are part of a local area network 118'. The content of the records stored in the user record database 114' will depend on the particular environment in which the present invention operates. However, the records should include a field for identifying, preferably uniquely identifying, a terminal or group of terminals, an order placed/not placed field or flag, and an order authorized/not authorized field or flag. Alternatively, a simple record including terminal identification information could be stored in a specific area of the database such that order information, service information, and/or authorization information may be inferred from the storage location. A state field which includes the information defined by the order placed/not placed field or flag and the order authorized/not authorized field or flag may be provided in addition to, or instead of the order placed/not placed field or flag and the order authorized/not authorized field or flag. The interactive session unit(s) 116' may be any means for establishing an interactive session with a terminal so that information required by the intelligent peripheral 102' can be acquired. The interactive voice response unit 116 of FIG. 1*b* can be thought of as a type of interactive session unit(s) 116'.

An order processing unit 125 may be any means for accepting information for placing an order (e.g., for a service) which can communicate such orders to the application processor(s) 112' of the intelligent peripheral 102' via communications path(s) 154' and the application input/output interface(s) 110'. The service order process 122 and integrated management system 124 of FIG. 1*b* can be thought of as a type of order processing unit 125. Further, the network 126 and link(s) 154 of FIG. 1*b* can be thought of as communications path(s) 154'. Although the order processing unit 125 is shown as being a part of the intelligent peripheral serving local network 104', it may be a part of another local network (e.g., 108*a*' or 108*b*') instead.

A transmitting terminal ID capture and user interface unit 130' may be any means for capturing an identification of a terminal and for establishing an interactive session with a terminal so that information required by the present invention can be acquired. Alternatively, the user interface functions of the transmitting terminal ID capture and user interface unit 130' may be carried out by the interactive session unit(s) 116'. The caller ID capture and user interface unit 130 of FIG. 1*b* may be thought of as a type of transmitting terminal capture and user interface unit 130'. The transmitting terminal ID capture and user interface unit 130' may communicate with the application processor(s) 112' of the intelligent peripheral 102' via communications path(s) 152'.

Although not shown, in FIG. 1*a*, the intelligent peripheral 102 may include a storage device for storing instructions to be executed by the application processor(s) 112', and for storing scripts and messages for use by the interactive session unit(s) 116' and/or the transmitting terminal ID capture and user interface unit 130'.

The order reception process 500 of FIG. 5 is the same when the present invention is implemented in the general environment 101 of FIG. 1*a*. More specifically, a terminal, which may be any terminal, first addresses the order processing unit 125 (e.g., via communications path 178, local network 108*a*', communications path 182', public inter-network 180', communications path 186', local network serving intelligent peripheral 104' and communications path 188, or via the local network serving the intelligent peripheral 104' and communications path 188). Then, as shown in step 502, the order processing unit 125 accepts order information from the terminal and forwards it to the application processor(s) 112 (e.g., via communication path 154' and an application processor input/output interface 110'). The application processor(s) 112' then, as shown in steps 504 and 506, determines whether or not the order has been pre-authorized based on records in the user record database 114'. If the order has been pre-authorized, the application processor(s) 112' stores the order as an activated order, as shown in steps 506 and 508. Otherwise, if the order has not been pre-authorized, the application processor(s) 112' stores the order, in the user directory 114', as an inactivated order, as shown in steps 506 and 510. Such an inactivated order may be provided with a time stamp relating to when the order was placed.

Figure 4B:
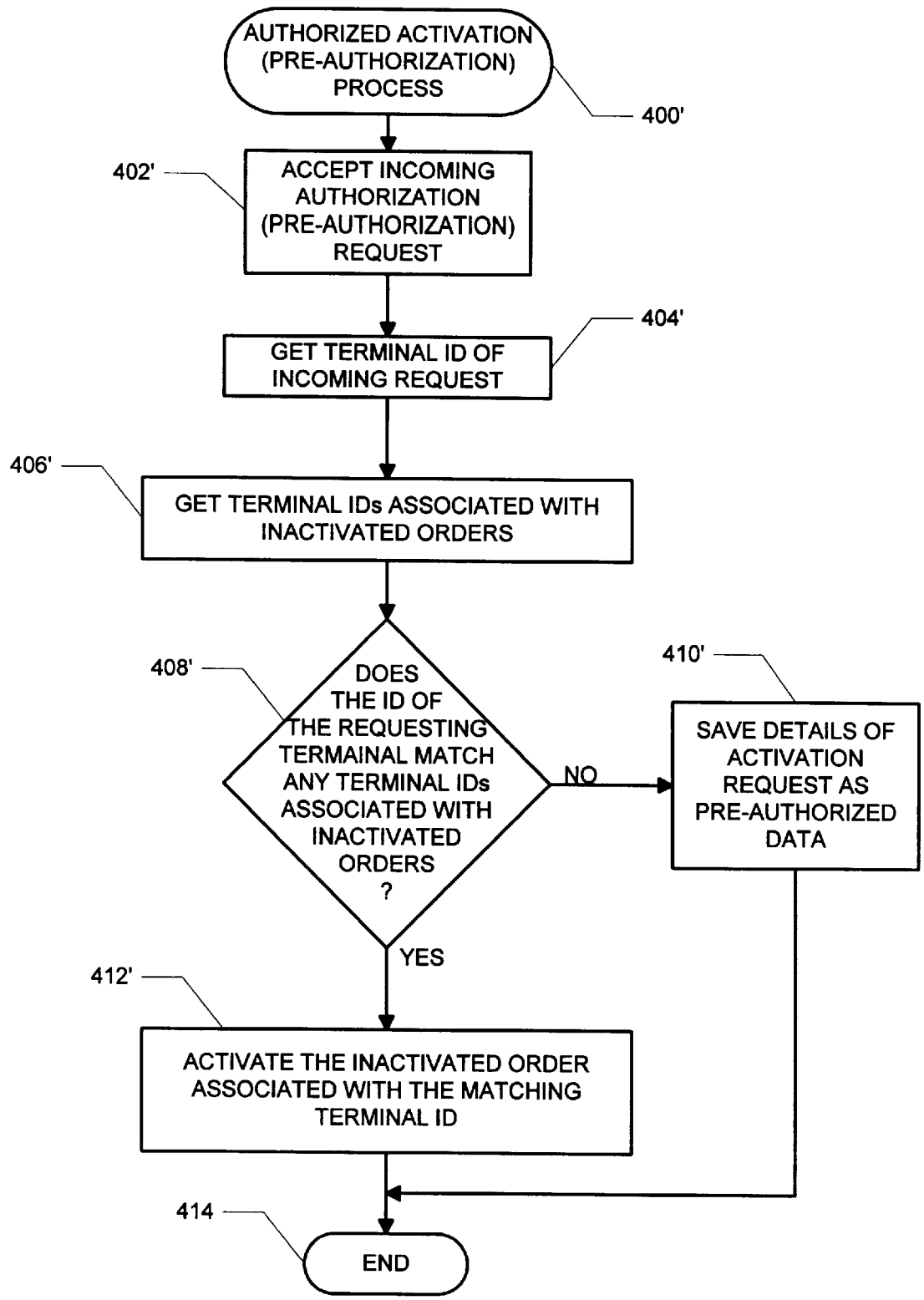

The authorization process 400' of FIG. 4*b* is used when the present invention is implemented in the general environment 101 of FIG. 1*a*. More specifically, a terminal, which may be any terminal, first addresses the transmitting terminal ID capture and user interface unit 130' (e.g., via communications path 178, local network 108*a*', communications path 182', public inter-network 180', communications path 186', local network serving intelligent peripheral 104' and communications path 150, or via the local network serving the intelligent peripheral 104' and communications path 150'). Then, as shown in step 402', the transmitting terminal ID capture and user interface 130' accepts the incoming authorization (or pre-authorization) request. Next, as shown in step 404', the transmitting terminal ID capture and user interface unit 130' gets the ID of the terminal which is the source of the incoming request. This information is forwarded to the application processor(s) 112' via communication path 152' and the application processor(s) input/output interface(s) 110'. The application processor(s) 112 then, as shown in steps 406' and 408', determines whether the ID of the requesting terminal matches any terminal ID associated with inactivated orders based on user records of user record database 114'. If the ID of the requesting terminal does not match any terminal ID associated with inactivated orders, the details of the authorization request are saved as pre-authorized data, as shown in steps 408' and 410'. The pre-authorization may be provided with a time stamp. If, on the other hand, the ID of the requesting terminal matches a terminal ID associated with an inactivated order, the inactivated order is activated, as shown in steps 408' and 412'. Optionally, if an inactivated order is older than a predetermined age from its timestamp, the placed/not placed field or flag may be changed to "not placed" or the state field may be changed from "Inactive Order—Awaiting Authorization" to "Inactive".

Naturally, more than one order type can be processed by the present invention. In such a case, an authorization or pre-authorization will be needed before a corresponding order or group of orders can be authorized. In this case, the user records of the user directory will either each include (A)(i) a service identification field, (ii) a terminal identification field, (iii) an order placed/not placed field or flag, and (iv) an authorized/not authorized field or flag, or (B) (i) a terminal identification field, (ii) an order placed/not placed field or flag for each service, and (iii) an authorized/not authorized field or flag for each service. Otherwise, the service order type may be inferred from an area in which a terminal identification record is stored.

Figure 8:
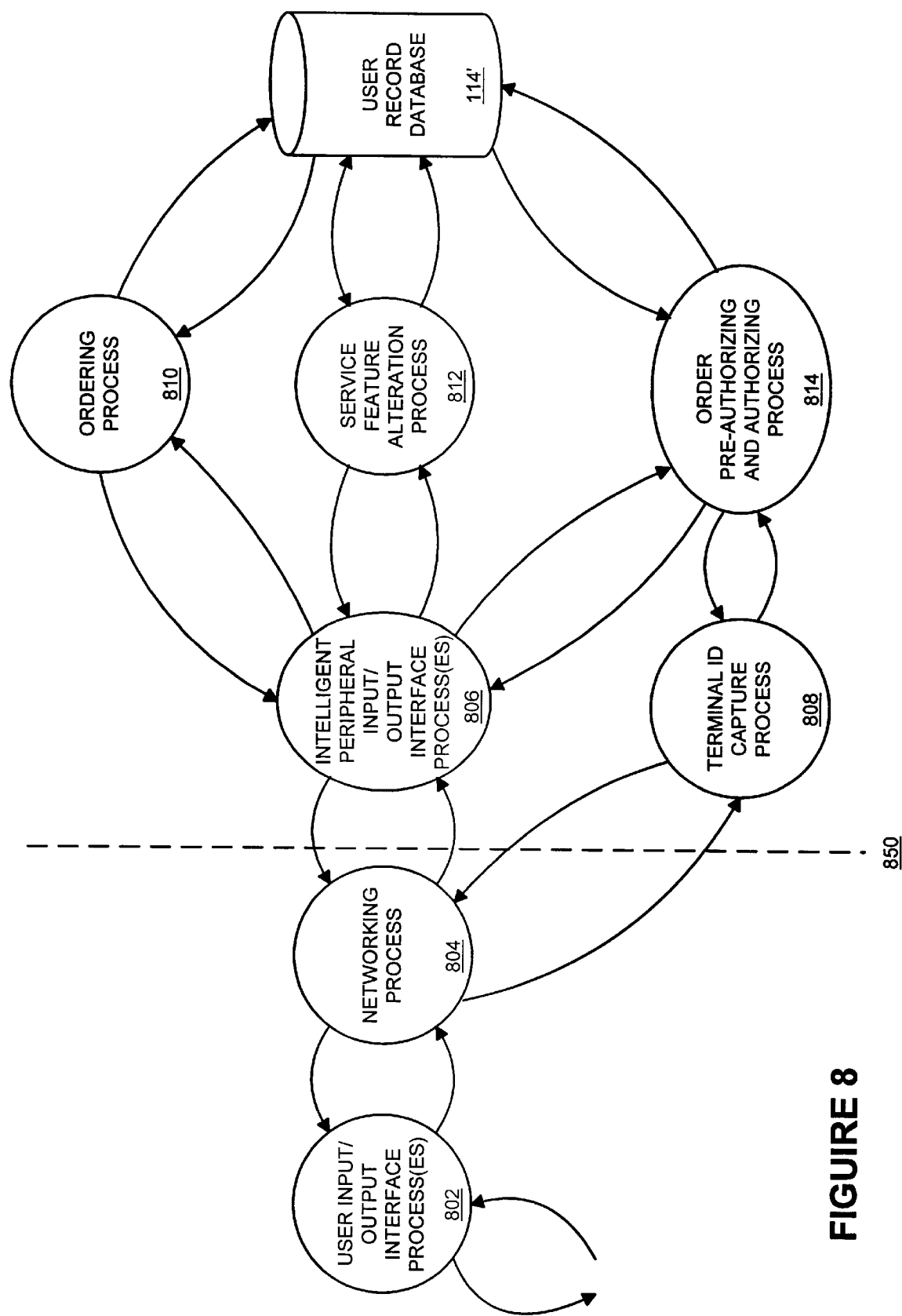
FIG. 8 is a process bubble diagram of processes which may be used to implement the present invention.

FIG. 8 is a process bubble diagram which illustrates processes for carrying out the present invention. The dashed line 850 separates processes which are carried out in an environment in which the present invention may operate (shown to the left of the dashed line 850) and processes which are carried out in apparatus of the present invention (shown to the right of the dashed line 850).

Referring to both FIG. 8 and FIG. 1a, the user input/output interface process(es) 802 may be carried out on a terminal 174. If the terminal 174 is a telephone for example, the user input interface process(es) 802 may be carried out by a telephone microphone, a hook switch, and a keypad and the user output interface process(es) 802 may be carried out by a telephone speaker (and/or a small LCD display). If the terminal 174 is a computer for example, the user input interface process(es) 802 may be carried out by a keypad, a microphone, a mouse, a keyboard, etc. and the user output interface process(es) 802 may be carried out by a video display monitor, speakers, etc.

The networking process 804 may be carried out by communications paths 178, 182', 144', 186', 140', 146' 150', 152', 154' and 188, as well as local networks 108a' 104', public inter-network 180' and private inter-network 106'. In a telephony environment for example, the networking process 804 may be carried out by local loops, central office switches, routers, trunks, the public switched telephone network, private networks, etc. In a computer environment, the networking process 804 may be carried out by modems, routers, bridges, local area networks, the Internet, etc.

The user input/output interface process(es) 802 interact with a user. These process(es) 802 also interact with the networking process 804 via communications path 178 (such as a local loop consisting of a twisted copper pair for example).

The terminal ID capture process 808 may be carried out on a stand alone unit for capturing the terminal ID of a transmitting terminal 130' (such as a caller ID capture and user interface unit 130 for example) or, may be carried out on the interactive session unit 116' (such as a PCMR having an intelligent ID capture capability). The networking process 804 interacts with the terminal ID capture process 808 via communications path 150' which may be a plain old telephone system (or "POTS") voice channel for example or via path(s) 146'.

The intelligent peripheral input/output interface process (es) 806 may be carried out by means for terminating links complying with one or more communications protocols (such as DS0, SCSI, SCSI-2, Ethernet, RS232, Switched 56 KBPS, X.25, asynchronous transfer mode (or "ATM"), and other packet or cell based protocols, integrated services digital network (or "ISDN"), any modem protocols (Bell 103, Bell 212, V.22bis, V.32, V.32bis, V.34, V.34bis, X2, etc.), frame relay protocols, etc.). The intelligent peripheral input/output interface process(es) 806 interacts with the networking process 804 via appropriate communications paths (See e.g., paths 148', 152', and 154' of FIG. 1a.).

The ordering process 810 (such as a service ordering process for example) may be carried out by processor(s) 112', order processing unit 125, and/or interactive session units 116' executing instructions for performing the steps of the process 500 shown in FIG. 5. The ordering process 810 interacts with a user record database 114' (via a local area network 118' for example) to retrieve and store needed user records. The ordering process 810 also interacts with appropriate ones of the intelligent peripheral input/output interface processes 806 so that it can request and retrieve needed information from entities or elements in the environment 101 (e.g., to the left of the dashed line 850).

The order authorizing and pre-authorizing process 814 (referred to simply as "the authorization process") (such as a service order authorizing or pre-authorizing process), may be carried out by processor(s) 112' and/or interactive session units 116' executing instructions for performing the steps of process 400' shown in FIG. 4b. The authorization process 814 interacts with the user record database 114' (via a local area network 118' for example) to retrieve and store needed user records. The authorization process 814 also interacts with the terminal ID capture process 808 to request and receive a terminal ID. Finally, the authorization process 814 also interacts with appropriate ones of the intelligent peripheral input/output interface processes 806 so that it can request and retrieve needed information from entities or elements in the environment 101 (e.g., to the left of the dashed line 850).

Finally, the service feature alteration process 812 may be carried out by processor(s) 112' and/or interactive session units 116' executing instructions for providing an interactive alteration session. The service feature alteration process 812 interacts with the user record database 114' (via a local area network for example) to retrieve and stored needed user records. The service feature alteration process 812 also interacts with appropriate ones of the intelligent peripheral input/output interface processes 806 so that it can request and retrieve needed information during the interactive session.

What is claimed is:

1. In an environment having a service provider, a subscribed terminal, and a remote terminal, a method for activating a service for the subscribed terminal, the method comprising steps of:

a) processing an order, from a terminal selected from a group consisting of the subscribed terminal and the remote terminal, for the service for the subscribed terminal; and b) processing an authorization request, from a terminal selected from a group consisting of the subscribed terminal and the remote terminal, for the service ordered, wherein the service order is activated only upon an authorization request from the subscribed terminal, and wherein the step of processing an order includes sub-steps of:

i) accepting order information;
ii) retrieving stored pre-authorized order data, if it exists;
iii) determining whether the order has been pre-authorized based on the stored pre-authorized order data retrieved; and
iv)
 (A) if the order has not been pre-authorized, storing the order information as an inactive order, and
 (B) if the order has been pre-authorized, processing the requested order so that the service is activated.

2. The method of claim 1 wherein the requested order is activated by storing the requested order as an activated order.

3. In an environment having a service provider, a subscribed terminal, and a remote terminal, a method for activating a service for the subscribed terminal, the method comprising steps of:
a) processing an order, from a terminal selected from a group consisting of the subscribed terminal and the remote terminal, for the service for the subscribed terminal; and
b) processing an authorization request, from a terminal selected from a group consisting of the subscribed terminal and the remote terminal, for the service ordered,
wherein the service order is activated only upon an authorization request from the subscribed terminal, and
wherein the step of processing an authorization request for the service ordered includes sub-steps of:
 i) accepting an incoming authorization request;
 ii) determining an identity of the terminal from which the authorization request was accepted;
 iii) determining whether the terminal identity determined is the subscribed terminal; and
 iv)
  A) if the terminal identity determined is not the subscribed terminal, do not authorize the order; and
  B) if the terminal identity determined is the subscribed terminal,
   1) retrieve terminal identifications associated with inactivated orders, if any,
   2) determine whether the terminal identity of the subscribed terminal matches one of the terminal identifications associated with inactive orders, and
   3)
    a) if the terminal identity of the subscribed terminal matches one of the terminal identifications associated with inactive orders, activate the inactive order associated with the matching terminal identification, and
    b) if the terminal identity of the subscribed terminal does not match any of the terminal identifications associated with inactive orders, save the authorization request as a pre-authorization for a service order to be placed for the subscribed terminal.

4. The method of claim 3 wherein the subscribed terminal is a telephone, wherein the sub-step of determining an identity of the terminal from which the authorization request was accepted is based on a caller ID value provided by a central office switch serving the requesting terminal, and wherein the retrieved terminal identifications associated with inactive orders are telephone directory numbers.

5. In an environment having a service provider, a subscribed terminal, and a remote terminal, a method for activating a service for the subscribed terminal, the method comprising steps of:
a) processing a request to pre-authorize an order for the service, from a terminal selected from a group consisting of the subscribed terminal and the remote terminal; and
b) processing an order, from a terminal selected from a group consisting of the subscribed terminal and the remote terminal, for the service for the subscribed terminal,
wherein the service to be ordered will only be pre-authorized upon a pre-authorization request from the subscribed terminal, and
wherein the step of pre-authorizing includes sub-steps of:
 i) accepting an incoming authorization request;
 ii) determining an identity of the terminal from which the authorization request was accepted;
 iii) determining whether the terminal identity determined is the subscribed terminal; and
 iv)
  A) if the terminal identity determined is not the subscribed terminal, do not authorize or pre-authorize the order; and
  B) if the terminal identity determined is the subscribed terminal,
   1) retrieve terminal identifications associated with inactivated orders, if any,
   2) determine whether the terminal identity of the subscribed terminal matches one of the terminal identifications associated with inactive orders, and
   3)
    a) if the terminal identity of the subscribed terminal matches one of the terminal identifications associated with inactive orders, activate the inactive order associated with the matching terminal identification, and
    b) if the terminal identity of the subscribed terminal does not match any of the terminal identifications associated with inactive orders, save the authorization request as a pre-authorization for a service order to be placed for the subscribed terminal.

6. The method of claim 5 wherein the step of processing an order includes sub-steps of:
i) accepting order information;
ii) retrieving stored pre-authorized order data, if it exists;
iii) determining whether the order has been pre-authorized based on the stored pre-authorized order data retrieved; and
iv)
 (A) if the order has not been pre-authorized, storing the order information as an inactive order, and
 (B) if the order has been pre-authorized, processing the requested order so that the service is activated.

7. The method of claim 5 wherein the subscribed terminal is a telephone, wherein the sub-step of determining an identity of the terminal from which the authorization request was accepted is based on a caller ID value provided by a central office switch serving the requesting terminal, and wherein the retrieved terminal identifications associated with inactive orders are telephone directory numbers.

8. In an environment including
a public inter-network,
a private inter-network,
at least one local network which can communicate with both the public inter-network and the private inter-network,
a terminal, belonging to one of the at least one local network,
a subscribed terminal belonging to one of the at least one local network, and
an order processing means,
an apparatus for activating a service for the subscribed terminal in response to an authorization request from a requesting terminal, the apparatus comprising:

a) a transmitting terminal ID capture unit for receiving an identification of the requesting terminal, via a first communications path, from one of the at least one local network;
b) an interactive session user interface unit for requesting information from the requesting terminal and for receiving information from the requesting terminal;
c) an application processor input/output interface unit for receiving orders, via a second communication path, from the order processing means;
d) a user record database containing records which include, or the location of which implies, information including (i) terminal identity information, (ii) information identifying the service, (iii) information expressing whether or not an order for the service was placed, and (iv) information expressing whether or not an order for the service has been authorized;
e) a system for permitting communication of data between the transmitting terminal ID capture unit, the interactive session user interface unit, the application processor input/output interface unit, and the user record database; and
f) an application processor, the application processor
   i) coupled with the application processor input/output interface unit and the system for permitting communication of data,
   ii) obtaining the identification of the requesting terminal from the transmitting terminal ID capture unit,
   iii) obtaining the orders received by the application processor input/output interface unit,
   iv) obtaining user records from the user record database,
   v) updating the user records of the user record database so that the information expressing whether or not an order for the service was placed indicates that an order was placed when an order is obtained, and
   vi) updating the user records of the user record database so that the information expressing whether or not an order for the service has been authorized indicates that an order is authorized only when the requesting terminal is the subscribed terminal.

9. The apparatus of claim 8 wherein the transmitting terminal ID capture unit is a caller identification capture unit.

10. The apparatus of claim 8 wherein the interactive session user interface unit is an interactive voice response unit.

11. The apparatus of claim 10 wherein the interactive voice response unit is controlled by the application processor.

12. The apparatus of claim 10 wherein the application processor downloads control scripts to the interactive voice response unit.

13. The apparatus of claim 12 wherein the application processor downloads voice prompts to the interactive voice response unit.

14. The apparatus of claim 8 wherein the terminal identity information of the records in the user record database includes a telephone directory number.

15. The apparatus of claim 8 wherein the interactive session user interface unit requests an identification of the subscribed terminal with which the service is to be associated, from the requesting terminal, the requesting terminal provides such an identification of the subscribed terminal, and the interactive session user interface forwards the received identification of the subscribed terminal to the application processor.

16. The apparatus of claim 8 wherein the application processor determines whether the identification of the subscribed terminal sent from the interactive session user interface unit matches the identification of the requesting terminal sent by the terminal ID capture unit.

17. The apparatus of claim 16 wherein if the application processor determines that the identification of the subscribed terminal sent from the interactive session user interface unit does not match the identification of the requesting terminal sent by the terminal ID capture unit, then the application processor instructs the requesting terminal, via the interactive session user interface unit, to submit an authorization request from the subscribed terminal.

18. In a telephony environment including a public switched telephone network, a private inter-network, at least one local network having a central office switch, which can communicate with both the public switched telephone network and the private inter-network, a terminal, belonging to one of the at least one local network, a subscribed terminal belonging to one of the at least one local network, and an order processing means an apparatus for activating a telephone service for the subscribed terminal in response to an authorization request from a requesting terminal, the apparatus comprising:
a) a caller ID capture unit for receiving a directory number of the requesting terminal, via a first communications path, from one of the at least one local network;
b) an interactive session user interface unit for requesting information from the requesting terminal and for receiving information from the requesting terminal;
c) an application processor input/output interface unit for receiving orders, via a second communication path, from the order processing means;
d) a user record database containing records which include, or the location of which implies, information including (i) terminal directory number information, (ii) information identifying the service, (iii) information expressing whether or not an order for the telephone service was placed, and (iv) information expressing whether or not an order for the service has been authorized;
e) a system for permitting communication of data between the caller ID capture unit, the interactive session user interface unit, the application processor input/output interface unit, and the user record database; and
f) an application processor, the application processor
   i) coupled with the application processor input/output interface unit and the system for permitting communication of data,
   ii) obtaining the directory number of the requesting terminal from the caller ID capture unit,
   iii) obtaining the orders received by the application processor input/output interface unit,
   iv) obtaining user records from the user record database,
   v) updating the user records of the user record database so that the information expressing whether or not an order for the telephone service was placed indicates that an order was placed when an order is obtained, and
   vi) updating the user records of the user record database so that the information expressing whether or not an order for the service has been authorized indicates that an order is authorized only when the requesting terminal is from the subscribed terminal.

19. The apparatus of claim 18 wherein the interactive session user interface unit is an interactive voice response unit.

20. The apparatus of claim 19 wherein the interactive voice response unit is controlled by the application processor.

21. The apparatus of claim 19 wherein the application processor downloads control scripts to the interactive voice response unit.

22. The apparatus of claim 21 wherein the application processor downloads voice prompts to the interactive voice response unit.

23. The apparatus of claim 18 wherein the interactive session user interface unit requests a directory number of the subscribed terminal with which the service is to be associated from the requesting terminal, the requesting terminal provides such a directory number of the subscribed terminal, and the interactive session user interface unit forwards the received directory number of the subscribed terminal to the application processor.

24. The apparatus of claim 23 wherein the requesting terminal provides the directory number of the subscribed terminal as dual tone multiple frequency signals.

25. The apparatus of claim 18 wherein the application processor determines whether the directory number of the subscribed terminal sent from the interactive session user interface unit matches the directory number of the requesting terminal sent by the caller ID capture unit.

26. The apparatus of claim 25 wherein if the application processor determines that the directory number of the subscribed terminal sent from the interactive session user interface unit does not match the directory number of the requesting terminal sent by the caller ID capture unit, then the application processor instructs the requesting terminal, via the interactive session user interface unit, to submit an authorization request from the subscribed terminal.

27. In a telephony environment having a telephone service provider, a subscribed terminal, and a remote terminal, a method for activating a telephone service for the subscribed terminal, the method comprising steps of:
a) processing an order, from a terminal selected from a group consisting of the subscribed terminal and the remote terminal, for the service for the subscribed terminal; and
b) processing an authorization request, from a terminal selected from a group consisting of the subscribed terminal and the remote terminal, for the telephone service ordered,
wherein the telephone service ordered is activated only upon an authorization request from the subscribed terminal, and
wherein the step of processing an order includes sub-steps of:
  i) accepting order information;
  ii) retrieving stored pre-authorized order data, if it exists;
  iii) determining whether the order has been pre-authorized based on the stored pre-authorized order data retrieved; and
  iv)
    (A) if the order has not been pre-authorized, storing the order information as an inactive order, and
    (B) if the order has been pre-authorized, processing the requested order so that the service is activated.

28. The method of claim 27 wherein the requested order is activated by storing the requested order as an activated order.

29. In a telephony environment having a telephone service provider, a subscribed terminal, and a remote terminal, a method for activating a telephone service for the subscribed terminal, the method comprising steps of:
a) processing an order, from a terminal selected from a group consisting of the subscribed terminal and the remote terminal, for the service for the subscribed terminal; and
b) processing an authorization request, from a terminal selected from a group consisting of the subscribed terminal and the remote terminal, for the telephone service ordered,
wherein the telephone service ordered is activated only upon an authorization request from the subscribed terminal, and
wherein the step of processing an authorization request for the telephone service ordered includes sub-steps of:
  i) accepting an incoming authorization request;
  ii) determining a directory number of the terminal from which the authorization request was accepted;
  iii) determining whether the directory number determined matches a directory number of the subscribed terminal; and
  iv)
    A) if the directory number determined does not match the directory number of the subscribed terminal, do not authorize the order; and
    B) if the directory number determined matches the directory number of the subscribed terminal,
      1) retrieve directory numbers associated with inactivated orders, if any,
      2) determine whether the directory number of the subscribed terminal matches one of the directory numbers associated with inactive orders, and
      3)
        a) if the directory number of the subscribed terminal matches one of the directory numbers associated with inactive orders, activate the inactive order associated with the matching directory number, and
        b) if the directory number of the subscribed terminal does not match any of the directory numbers associated with inactive orders, save the authorization request as pre-authorization for a service order to be placed for the subscribed terminal.

30. The method of claim 29 wherein the sub-step of determining the directory number of the terminal from which the authorization request was accepted is based on a caller ID value provided by a central office switch serving the requesting terminal.

31. In an environment having a telephone service provider, a subscribed terminal, and a remote terminal, a method for activating a telephone service for the subscribed terminal, the method comprising steps of:
a) processing a request to pre-authorize an order for the telephone service, from a terminal selected from a group consisting of the subscribed terminal and the remote terminal; and
b) processing an order, from a terminal selected from a group consisting of the subscribed terminal and the remote terminal, for the telephone service for the subscribed terminal
wherein the telephone service ordered will only be pre-authorized upon a pre-authorization request from the subscribed terminal, and
wherein the step of pre-authorizing includes sub-steps of:
  i) accepting an incoming authorization request;
  ii) determining a directory number of the terminal from which the authorization request was accepted;
  iii) determining whether the directory number determined matches a directory number of the subscribed terminal; and
  iv)
    A) if the directory number determined does not match the directory number of the subscribed terminal, do not authorize or pre-authorize the order; and B) if the directory number determined matches the directory number of the subscribed terminal,
   1) retrieve directory numbers associated with inactivated orders, if any,
   2) determine whether the directory number of the subscribed terminal matches one of the directory numbers associated with inactive orders, and
   3)
      a) if the directory number of the subscribed terminal matches one of the directory numbers associated with inactive orders, activate the inactive order associated with the matching directory number, and
      b) if the directory number of the subscribed terminal does not match any of the directory numbers associated with inactive orders, save the pre-authorization request as a pre-authorization for a telephone service order to be placed for the subscribed terminal.

32. The method of claim 31 wherein the step of processing an order includes sub-steps of:
i) accepting order information;
ii) retrieving stored pre-authorized order data, if it exists;
iii) determining whether the order has been pre-authorized based on the stored pre-authorized order data retrieved; and
iv)
   (A) if the order has not been pre-authorized, storing the order information as an inactive order, and
   (B) if the order has been pre-authorized, processing the requested order so that the service is activated.

33. The method of claim 31 wherein the sub-step of determining a directory number of the terminal from which the authorization request was accepted is based on a caller ID value provided by a central office switch serving the requesting terminal.

34. In an environment having a service provider, a subscribed terminal, and a remote terminal, a method for processing an authorization request to activate an ordered service for the subscribed terminal, the method comprising steps of:
a) accepting an incoming authorization request;
b) determining an identity of the terminal from which the authorization request was accepted;
c) determining whether the terminal identity determined is the subscribed terminal; and
d)
   i) if the terminal identity determined is not the subscribed terminal, do not authorize the order; and
   ii) if the terminal identity determined is the subscribed terminal,
      A) retrieve terminal identifications associated with inactivated orders, if any,
      B) determine whether the terminal identity of the subscribed terminal matches one of the terminal identifications associated with inactive orders, and
      C)
         1) if the terminal identity of the subscribed terminal matches one of the terminal identifications associated with inactive orders, activate the inactive order associated with the matching terminal identification, and
         2) if the terminal identity of the subscribed terminal does not match any of the terminal identifications associated with inactive orders, save the authorization request as a pre-authorization for a service order to be placed for the subscribed terminal.

35. The method of claim 34 wherein the subscribed terminal is a telephone, wherein the sub-step of determining an identity of the terminal from which the authorization request was accepted is based on a caller ID value provided by a central office switch serving the requesting terminal, and wherein the retrieved terminal identifications associated with inactive orders are telephone directory numbers.

36. In an environment having a service provider, a subscribed terminal, and a remote terminal, a method for processing a request to pre-authorize an order to be placed for a service for the subscribed terminal, the method comprising steps of:
a) accepting an incoming authorization request;
b) determining an identity of the terminal from which the authorization request was accepted;
c) determining whether the terminal identity determined is the subscribed terminal; and
d)
   i) if the terminal identity determined is not the subscribed terminal, do not authorize or pre-authorize the order; and
   ii) if the terminal identity determined is the subscribed terminal,
      A) retrieve terminal identifications associated with inactivated orders, if any,
      B) determine whether the terminal identity of the subscribed terminal matches one of the terminal identifications associated with inactive orders, and
      C)
         1) if the terminal identity of the subscribed terminal matches one of the terminal identifications associated with inactive orders, activate the inactive order associated with the matching terminal identification, and
         2) if the terminal identity of the subscribed terminal does not match any of the terminal identifications associated with inactive orders, save the authorization request as a pre-authorization for a service order to be placed for the subscribed terminal.

37. The method of claim 36 wherein the subscribed terminal is a telephone, wherein the sub-step of determining an identity of the terminal from which the authorization request was accepted is based on a caller ID value provided by a central office switch serving the requesting terminal, and wherein the retrieved terminal identifications associated with inactive orders are telephone directory numbers.

* * * * *